United States Patent
Kawata

(10) Patent No.: US 11,260,899 B2
(45) Date of Patent: Mar. 1, 2022

(54) ELECTRIC DRIVE DEVICE AND ELECTRIC POWER STEERING DEVICE

(71) Applicant: NSK LTD., Tokyo (JP)

(72) Inventor: Masaaki Kawata, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/312,250

(22) PCT Filed: Dec. 19, 2019

(86) PCT No.: PCT/JP2019/049954
§ 371 (c)(1),
(2) Date: Jun. 9, 2021

(87) PCT Pub. No.: WO2020/130107
PCT Pub. Date: Jun. 25, 2020

(65) Prior Publication Data
US 2021/0354746 A1 Nov. 18, 2021

(30) Foreign Application Priority Data

Dec. 19, 2018 (JP) .............................. JP2018-237774
Jul. 17, 2019 (JP) .............................. JP2019-132223
Sep. 26, 2019 (JP) .............................. JP2019-176145

(51) Int. Cl.
*H02K 11/33* (2016.01)
*B62D 5/04* (2006.01)
(Continued)

(52) U.S. Cl.
CPC ......... *B62D 5/0424* (2013.01); *B62D 5/0406* (2013.01); *H02K 5/225* (2013.01);
(Continued)

(58) Field of Classification Search
CPC .... B62D 5/0424; B62D 5/0406; H02K 11/21; H02K 11/33; H02K 5/225; H02K 21/16; H02K 2203/09
(Continued)

(56) References Cited

U.S. PATENT DOCUMENTS 9,359,004 B2 6/2016 Kawata et al.
9,985,504 B2 5/2018 Yamanaka
(Continued)

FOREIGN PATENT DOCUMENTS

CN 103190060 A 7/2013
CN 107529347 A 12/2017
(Continued)

OTHER PUBLICATIONS

Japanese Decision of a Patent Grant for 2020-561529 dated Mar. 31, 2021.
(Continued)

*Primary Examiner* — Terrance L Kenerly
(74) *Attorney, Agent, or Firm* — Sughrue Mion, PLLC

(57) ABSTRACT

An electric drive device and an electric power steering device are provided that reduce the size of a motor in an axial direction parallel to a shaft and in a radial direction of the shaft. The electric drive device includes a bus bar module in which a connector, a first power supply terminal, a second power supply terminal, positive electrode bus bar wiring that electrically connects the connector to the first power supply terminal, and negative electrode bus bar wiring that electrically connects the connector to the second power supply terminal are integrally formed with the connector. The positive electrode bus bar wiring and the negative electrode bus bar wiring extend from the connector, bypass an extended line of the shaft, and are electrically connected to the circuit board in positions at distances from the connector larger than a distance from the connector to the extended line of the shaft.

15 Claims, 19 Drawing Sheets

(51) Int. Cl.
  *H02K 21/16* (2006.01)
  *H02K 11/21* (2016.01)
  *H02K 5/22* (2006.01)
(52) U.S. Cl.
  CPC ............ *H02K 11/21* (2016.01); *H02K 11/33* (2016.01); *H02K 21/16* (2013.01); *H02K 2203/09* (2013.01)
(58) Field of Classification Search
  USPC .......................................... 310/71; 180/65.1
  See application file for complete search history.

(56) References Cited

U.S. PATENT DOCUMENTS

| | | | |
|---|---|---|---|
| 10,696,320 | B2 | 6/2020 | Asao et al. |
| 2013/0181569 | A1 | 7/2013 | Nakagawa et al. |
| 2018/0127020 | A1 | 5/2018 | Asao et al. |
| 2020/0195098 | A1 | 6/2020 | Shimakawa et al. |

FOREIGN PATENT DOCUMENTS

| | | | |
|---|---|---|---|
| JP | 2007-288929 | A | 11/2007 |
| JP | 2016-34204 | A | 3/2016 |
| JP | 5951067 | B1 | 7/2016 |
| JP | 2016-167963 | A | 9/2016 |
| JP | 2017-92100 | A | 5/2017 |
| KR | 10-2017-0045663 | A | 4/2017 |
| KR | 10-2018-0043656 | A | 4/2018 |
| WO | 2016/163037 | A1 | 10/2016 |
| WO | 2018/062006 | A1 | 4/2018 |
| WO | 2018/221726 | A | 12/2018 |

OTHER PUBLICATIONS

International Search Report for PCT/JP2019/049954 dated Mar. 17, 2020 (PCT/ISA/210).
Communication dated Jul. 13, 2021 from the China National Intellectual Property Administration in CN Application No. 201980057678.4.

FIG.16
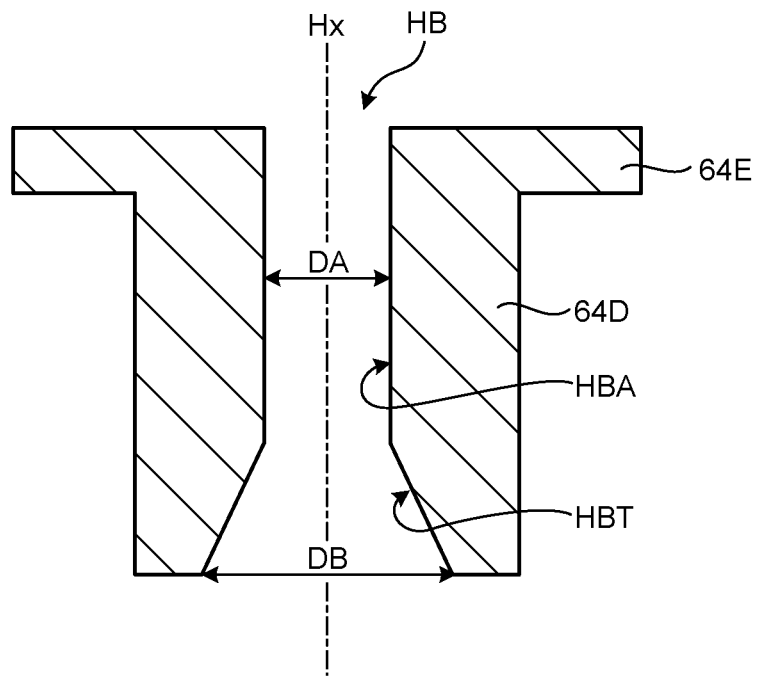
FIG.17
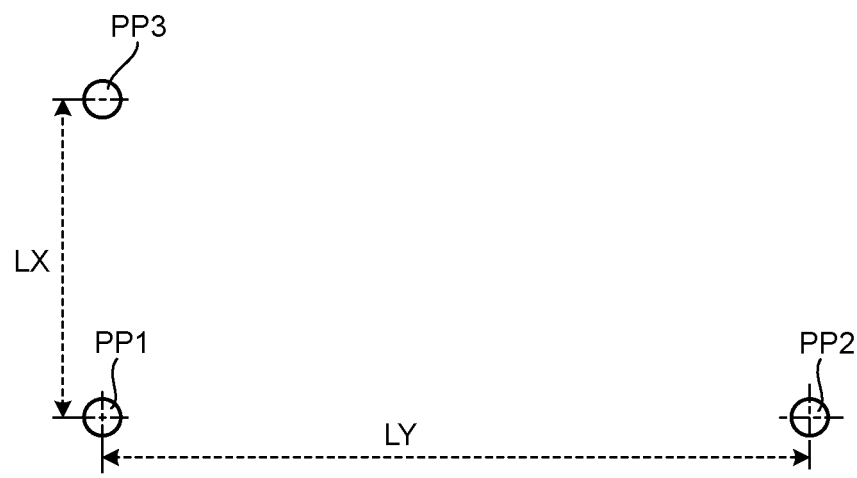
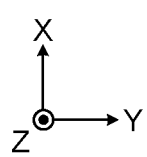

ELECTRIC DRIVE DEVICE AND ELECTRIC POWER STEERING DEVICE

CROSS REFERENCE TO RELATED APPLICATIONS

This application is a National Stage of International Application No. PCT/JP2019/049954 filed Dec. 19, 2019, claiming priority based on Japanese Application No. 2018-237774 filed Dec. 19, 2018, Japanese Patent Application No. 2019-132223 filed Jul. 17, 2019, and Japanese Patent Application No. 2019-176145 filed Sep. 26, 2019.

FIELD

The present invention relates to an electric drive device and an electric power steering device provided with an electronic control device for controlling rotation of a motor.

BACKGROUND

An electric power steering device that uses a motor to generate steering assist torque is provided with an electronic control device serving as a device for controlling the motor. For example, Patent Literature 1 describes a drive device having electronic components densely mountable on a substrate.

CITATION LIST

Patent Literature

Patent Literature 1: Japanese Patent Application Laid-open No. 2016-034204
Patent Literature 2: Japanese Patent Application Laid-open No. 2007-288929
Patent Literature 3: Japanese Patent Application Laid-open No. 2017-092100

SUMMARY

Technical Problem

In the electric drive device of Patent Literature 1, a motor, an electronic control device, and connectors are arranged in this order along an axial direction parallel to a shaft of the motor. The direction of insertion into and removal from the connectors is the axial direction. Therefore, the electric drive device of Patent Literature 1 increases in size in the axial direction.

In contrast, in an electric drive device of each of Patent Literature 2 and Patent Literature 3, the direction of insertion into and removal from a connector is a radial direction of a shaft of a motor. With this configuration, the electric drive device of each of Patent Literature 2 and Patent Literature 3 has a smaller size in the axial direction than that of the electric drive device of Patent Literature 1.

In the electric drive device of each of Patent Literature 2 and Patent Literature 3, a connector terminal is electrically connected to a substrate. Power supplied from the terminal is supplied through power supply wiring in the substrate to a power circuit including, for example, field-effect transistors (FETs) that supplies a current to a coil group. As the power for driving the motor increases, the power supply wiring in the substrate needs to be larger, leading to a larger area of the substrate (refer to paragraph [0015] and FIG. 2 of Patent Literature 3). Thus, the electric drive device is required to have a smaller size in the radial direction of the shaft of the motor.

The present invention has been made in view of the above-described problem, and it is an object thereof to provide an electric drive device and an electric power steering device that reduce the size of the motor in the axial direction parallel to the shaft and in the radial direction of the shaft.

Solution to Problem

To achieve the above object, An electric drive device according to an aspect comprising: a motor that includes a shaft, a motor rotor interlocked with the shaft, a motor stator including a stator core configured to rotate the motor rotor and a plurality of coil groups that are divided into at least two systems of first coil groups and second coil groups for each of three phases, and are configured to excite the stator core with three-phase alternating currents, and a tubular housing that accommodates therein the motor rotor, the motor stator, and the coil groups; an electronic control device that includes a magnet provided at an anti-load side end of the shaft in order to control drive of the motor, and a circuit board disposed on the anti-load side of the shaft on an extended line thereof extending in an axial direction of the shaft; first coil wiring that connects the first coil groups to the circuit board; second coil wiring that connects the second coil groups to the circuit board; a bus bar module in which a connector, a first power supply terminal, a second power supply terminal, positive electrode bus bar wiring that electrically connects the connector to the first power supply terminal, and negative electrode bus bar wiring that electrically connects the connector to the second power supply terminal are integrally formed with the connector; and a heat sink that has a groove on the anti-load side, has the bus bar module inserted in the groove, and supports the circuit board disposed on the anti-load side of the bus bar module, wherein the circuit board includes: a board body; a rotation angle sensor configured to detect rotation of the magnet; a first power circuit including a plurality of electronic components configured to supply currents to the first coil groups; a second power circuit including a plurality of electronic components configured to supply currents to the second coil groups; and a control circuit including an electronic component configured to control the currents supplied by at least one of the first power circuit and the second power circuit, the rotation angle sensor is mounted on a first surface of the board body and is opposed to the magnet, and the positive electrode bus bar wiring and the negative electrode bus bar wiring extend from the connector, bypass an extended line of the shaft, and are electrically connected to the circuit board in positions at distances from the connector larger than a distance from the connector to the extended line of the shaft.

The above-described configuration reduces the size of the motor in the axial direction parallel to the shaft and in the radial direction of the shaft.

As a desirable aspect, the bus bar module comprises a communication terminal, and the communication terminal is electrically connected to the board body in a position at a distance from the connector smaller than the distance from the connector to the extended line of the shaft. This configuration allows the control circuit to be disposed closer than the first power circuit and the second power circuit to the connector.

As a desirable aspect, at least one or some of the electronic components included in the first power circuit and at least one or some of the electronic components included in the second power circuit are mounted on the first surface of the board body, and are opposed to the heat sink with a heat dissipation material interposed therebetween. The configuration can reduce heat generated by the first power circuit and the second power circuit.

As a desirable aspect, the bus bar module has a through-hole, and the rotation angle sensor and the magnet are disposed in the through-hole as viewed from the axial direction. The configuration can restrain foreign matter from getting into a periphery of a magnetic sensor.

As a desirable aspect, a thickness in the axial direction of each of the positive electrode bus bar wiring and the negative electrode bus bar wiring around the through-hole is larger than a width of each of the positive electrode bus bar wiring and the negative electrode bus bar wiring in a direction orthogonal to the axial direction. This configuration reduces electrical resistances in the bus bar module while reducing a projected area thereof.

As a desirable aspect, the first coil wiring or the second coil wiring passes through the heat sink with a resin of the bus bar module interposed between wires thereof, and is electrically connected to the board body. This configuration reduces the size of the motor in the axial direction parallel to the shaft and in the radial direction of the shaft. In addition, electrical insulation properties between the first coil wiring or the second coil wiring and the heat sink are ensured.

As a desirable aspect, the bus bar module comprises a guide portion accommodated in a through-hole of the heat sink, and the through-hole of the guide portion has a tapered inner wall having a diameter gradually decreasing as a depth increases from a load side toward the anti-load side. As a result, electrical connection stability between the first coil wiring or the second coil wiring and the circuit board increases.

As a desirable aspect, the bus bar module comprises a first bridge portion, a second bridge portion, a ring-shaped portion, and a frame portion, the ring-shaped portion is disposed between the first bridge portion and the second bridge portion, the second bridge portion, the ring-shaped portion, and the frame portion surround a raised portion having a second surface raised from a first surface at a bottom of the groove, and the through-hole of the heat sink is located between a rim portion on an outer circumference of the heat sink and the raised portion. This configuration reduces torsion of the bas bar module.

As a desirable aspect, the rotation angle sensor and the magnet are disposed in the ring-shaped portion. The configuration can restrain the foreign matter from getting into the periphery of the magnetic sensor.

As a desirable aspect, the bus bar module comprises a plurality of fixation positioning pins and a ring-shaped portion having a though-hole in which the magnet is inserted, and the heat sink has a plurality of positioning holes on the anti-load side thereof, and the fixation positioning pins are inserted in the positioning holes. The configuration can increase positional accuracy of the bus bar module with respect to the heat sink.

As a desirable aspect, the bus bar module is accommodated within a level difference provided on the anti-load side of the heat sink, a gap is present between an outer circumference of the ring-shaped portion and a wall surface of a groove generated by the level difference of the heat sink, the fixation positioning pins are present at three or more places, and the fixation positioning pins are not arranged in a straight line.

This configuration reduces the size of the motor in the axial direction parallel to the shaft and in the radial direction of the shaft. Since the gap is present between the outer circumference of the ring-shaped portion and the wall surface of the groove generated by the level difference of the heat sink, the gap can reduce an influence of a thermal expansion of the bus bar module even if the coefficient of thermal expansion of the bus bar module differs from a coefficient of thermal expansion of the heat sink. Since the gap is present between the outer circumference of the ring-shaped portion and the wall surface of the groove generated by the level difference of the heat sink, a mounting position of the bus bar module with respect to the heat sink is less likely to be affected by a molding tolerance of the bus bar module even if the molding tolerance is larger than a forming tolerance of the heat sink, because of the presence of the gap. The fixation positioning pins increase the mounting accuracy of the bus bar module with respect to the heat sink. The fixation positioning pins are present at three or more places, and the fixation positioning pins are not arranged in a straight line. This configuration ensures a distance of the gap present between the outer circumference of the ring-shaped portion and the wall surface of the groove generated by the level difference of the heat sink.

As a desirable aspect, the bus bar module comprises board positioning pins that project in a direction opposite to that of the fixation positioning pins, and the board positioning pins penetrate the circuit board from the bus bar module. This configuration increases the mounting accuracy of the circuit board with respect to the bus bar module.

As a desirable aspect, the board positioning pins are present at three or more places, and the board positioning pins are not arranged in a straight line. This configuration restrains rotation of the circuit board relative to the bus bar module.

As a desirable aspect, the board positioning pins are located in the same positions as those of the fixation positioning pins as viewed in the axial direction of the shaft. This configuration allows the positions of the fixation positioning pins to be recognized via the board positioning pins, so that the heat sink can easily be assembled with the bus bar module.

As a desirable aspect, an electric power steering device comprising the above electric drive device, the electric drive device is configured to generate steering assist torque. This configuration reduces the size of the motor in the axial direction parallel to the shaft and in the radial direction of the shaft, and increases the degree of freedom of layout of the electric power steering device.

Advantageous Effects of Invention

The present invention can provide an electric drive device and an electric power steering device that reduce the size of a motor in an axial direction parallel to a shaft and in a radial direction of the shaft.

BRIEF DESCRIPTION OF DRAWINGS

FIG. 16 is a sectional view for explaining a through-hole of the guide portion of the bus bar module.

FIG. 17 is a plan view for explaining planar positions of positioning portions of the bus bar module.

DESCRIPTION OF EMBODIMENTS

Modes (embodiments) for carrying out the present invention will be described in detail with reference to the drawings. The present invention is not limited to the content described in the following embodiments. The components described below include those easily conceivable by those skilled in the art and those substantially the same. In addition, the components described below can be combined as appropriate.

Figure 1:
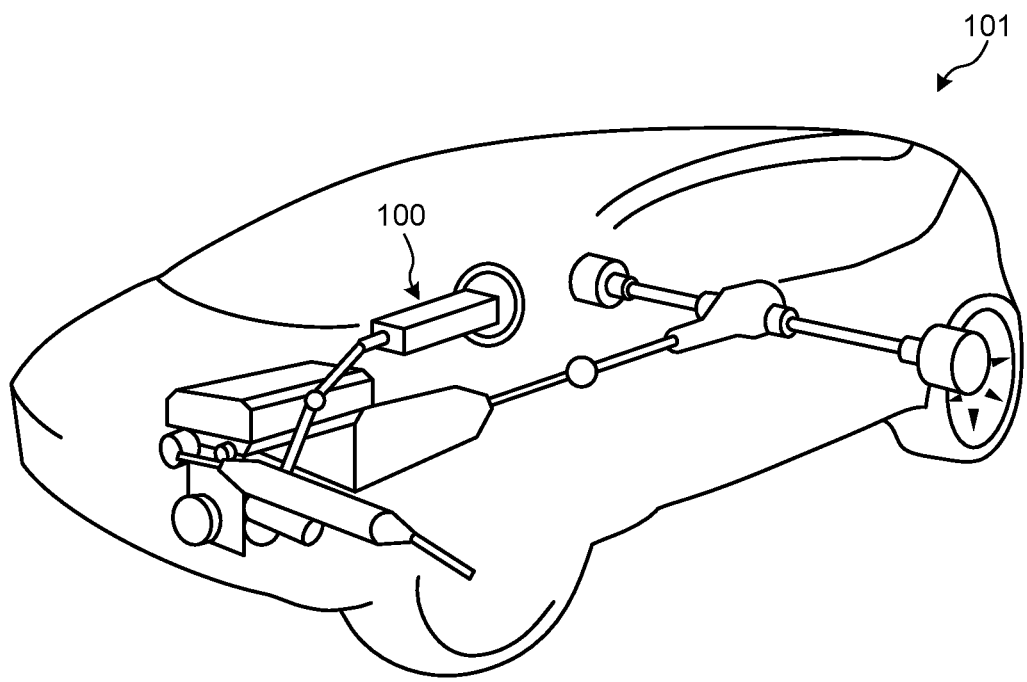
FIG. 1 is a perspective view schematically illustrating a vehicle provided with an electric power steering device according to embodiments of the present invention.
Figure 2:
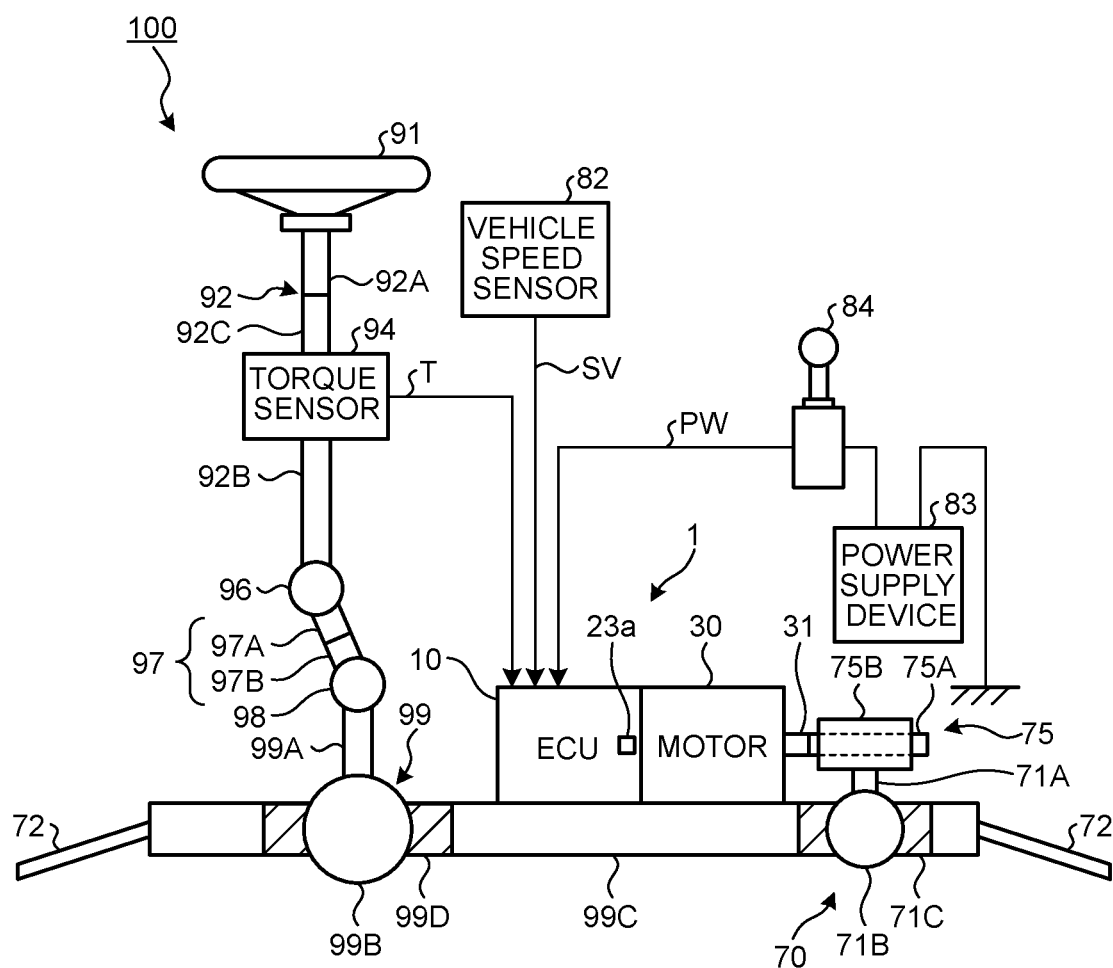
FIG. 2 is a schematic diagram of the electric power steering device according to the embodiments.

FIG. 1 is a perspective view schematically illustrating a vehicle provided with an electric power steering device according to embodiments of the present invention. FIG. 2 is a schematic diagram of the electric power steering device according to the embodiments. As illustrated in FIG. 1, a vehicle 101 is provided with an electric power steering device 100. An outline of the electric power steering device 100 will be described with reference to FIG. 2.

The electric power steering device 100 is provided with a steering wheel 91, a steering shaft 92, a universal joint 96, an intermediate shaft 97, a universal joint 98, a first rack-and-pinion mechanism 99, and tie rods 72, in the order of transmission of a force applied from a driver (operator). The electric power steering device 100 is also provided with a torque sensor 94 for detecting steering torque of the steering shaft 92, a motor 30, an electronic control device (hereafter, called "electronic control unit (ECU)") 10 for controlling the motor 30, a speed reducer 75, and a second rack-and-pinion mechanism 70. A vehicle body is provided with a vehicle speed sensor 82, a power supply device 83 (such as an in-vehicle battery), and an ignition switch 84. The vehicle speed sensor 82 detects a traveling speed of the vehicle 101. The vehicle speed sensor 82 outputs a detected vehicle speed signal SV to the ECU 10 through Controller Area Network (CAN) communication. The ECU 10 is supplied with power from the power supply device 83 while the ignition switch 84 is in an on state.

An electric drive device 1 is provided with the motor 30 and the ECU 10 fixed to an anti-load side of a shaft 31 of the motor 30. The electric drive device 1 may be provided with an adapter for connecting the ECU 10 to the motor 30.

As illustrated in FIG. 2, the steering shaft 92 includes an input shaft 92A, an output shaft 92B, and a torsion bar 92C. The input shaft 92A is connected at one end thereof to the steering wheel 91, and connected at the other end thereof to the torsion bar 92C. The output shaft 92B is connected at one end thereof to the torsion bar 92C, and connected at the other end thereof to the universal joint 96. The torque sensor 94 detects torsion of the torsion bar 92C to detect the steering torque applied to the steering shaft 92. The torque sensor 94 outputs a steering torque signal T corresponding to the detected steering torque to the ECU 10 through the CAN communication. The steering shaft 92 is rotated by a steering force applied to the steering wheel 91.

The intermediate shaft 97 includes an upper shaft 97A and a lower shaft 97B, and transmits the torque of the output shaft 92B. The upper shaft 97A is connected through the universal joint 96 to the output shaft 92B. The lower shaft 97B is, in turn, connected through the universal joint 98 to a first pinion shaft 99A of the first rack-and-pinion mechanism 99. The upper shaft 97A and the lower shaft 97B are, for example, splined to each other.

The first rack-and-pinion mechanism 99 includes the first pinion shaft 99A, a first pinion gear 99B, a rack shaft 99C, and a first rack 99D. The first pinion shaft 99A is connected at one end thereof to the lower shaft 97B through the universal joint 98, and connected at the other end thereof to the first pinion gear 99B. The first rack 99D provided on the rack shaft 99C meshes with the first pinion gear 99B. The rotary motion of the steering shaft 92 is transmitted through the intermediate shaft 97 to the first rack-and-pinion mechanism 99. This rotary motion is converted by the first rackand-pinion mechanism 99 into linear motion of the rack shaft 99C. The respective tie rods 72 are connected to both ends of the rack shaft 99C.

The motor 30 is a motor that generates steering assist torque for assisting the steering of the driver. The motor 30 may be a brushless motor or a brushed motor having brushes and a commutator.

The ECU 10 is provided with a rotation angle sensor 23a. The rotation angle sensor 23a detects a rotation phase of the motor 30. The ECU 10 acquires a rotation phase signal of the motor 30 from the rotation angle sensor 23a, the steering torque signal T from the torque sensor 94, and the vehicle speed signal SV of the vehicle 101 from the vehicle speed sensor 82. The ECU 10 calculates an auxiliary steering command value of an assist command based on the rotation phase signal, the steering torque signal T, and the vehicle speed signal SV. The ECU 10 supplies a current to the motor 30 based on the calculated auxiliary steering command value.

The speed reducer 75 is provided with a worm shaft 75A that rotates integrally with the shaft 31 of the motor 30, and a worm wheel 75B that meshes with the worm shaft 75A. Accordingly, the rotary motion of the shaft 31 is transmitted to the worm wheel 75B through the worm shaft 75A. In the embodiments, the speed reducer 75 side of the shaft 31 is called a load side end, and a side opposite to the speed reducer 75 of the shaft 31 is called an anti-load side end.

The second rack-and-pinion mechanism 70 includes a second pinion shaft 71A, a second pinion gear 71B, and a second rack 71C. The second pinion shaft 71A is fixed at one end thereof to the worm wheel 75B so as to rotate coaxially and integrally therewith. The second pinion shaft 71A has the other end thereof connected to the second pinion gear 71B. The second rack 71C provided on the rack shaft 99C mashes with the second pinion gear 71B. The rotary motion of the motor 30 is transmitted to the second rack-and-pinion mechanism 70 through the speed reducer 75. This rotary motion is converted by the second rack-and-pinion mechanism 70 into the linear motion of the rack shaft 99C.

The steering force applied to the steering wheel 91 by the driver is transmitted through the steering shaft 92 and the intermediate shaft 97 to the first rack-and-pinion mechanism 99. The first rack-and-pinion mechanism 99 transmits the transmitted steering force as a force applied in the axial direction of the rack shaft 99C to the rack shaft 99C. At this time, the ECU 10 acquires the steering torque signal T applied to the steering shaft 92 from the torque sensor 94. The ECU 10 acquires the vehicle speed signal SV from the vehicle speed sensor 82. The ECU 10 acquires the rotation phase signal of the motor 30 from the rotation angle sensor 23a. Then, the ECU 10 outputs a control signal to control the operation of the motor 30. The steering assist torque output by the motor 30 is transmitted to the second rack-and-pinion mechanism 70 through the speed reducer 75. The second rack-and-pinion mechanism 70 transmits the steering assist torque as a force applied in the axial direction of the rack shaft 99C to the rack shaft 99C. In this way, the steering of the steering wheel 91 by the driver is assisted by the electric power steering device 100.

As illustrated in FIG. 2, the electric power steering device 100 is a rack assisted system in which the assist force is applied to the second rack-and-pinion mechanism 70, but is not limited to this system. The electric power steering device 100 may be a column assisted system in which the assist force is applied to the steering shaft 92, or a pinion assisted system in which the assist force is applied to the first pinion gear 99B.

Figure 3:
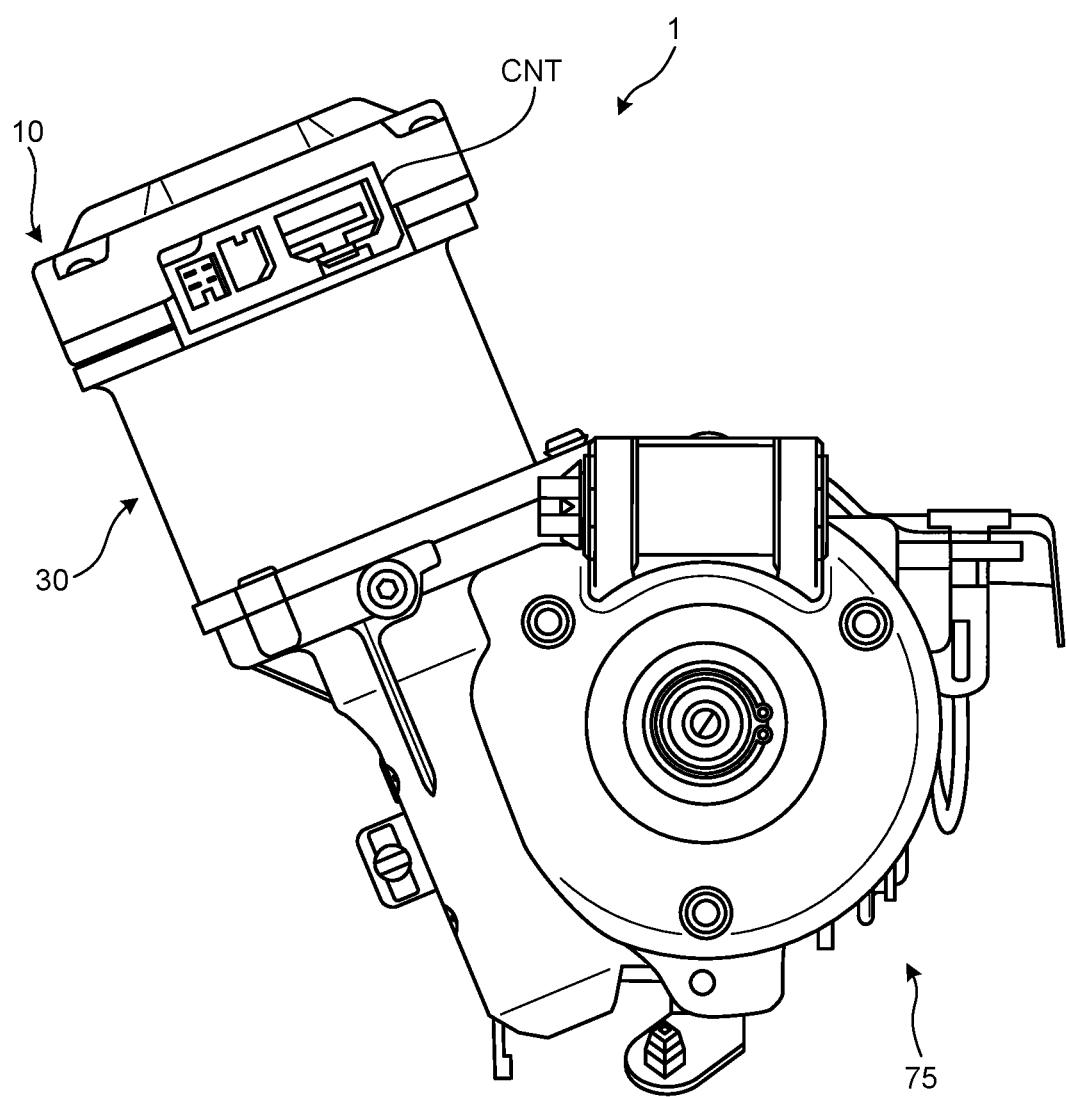
FIG. 3 is a side view illustrating an arrangement example of an electronic control unit (ECU) according to the embodiments.

FIG. 3 is a side view illustrating an arrangement example of the ECU according to the embodiments. As illustrated in FIG. 3, the electric drive device 1 including the ECU 10 and the motor 30 is mounted on the speed reducer 75. A wire harness can be inserted in and removed from a connector CNT illustrated in FIG. 3 parallel to a direction in which the rack shaft 99C illustrated in FIG. 2 extends.

Figure 4:
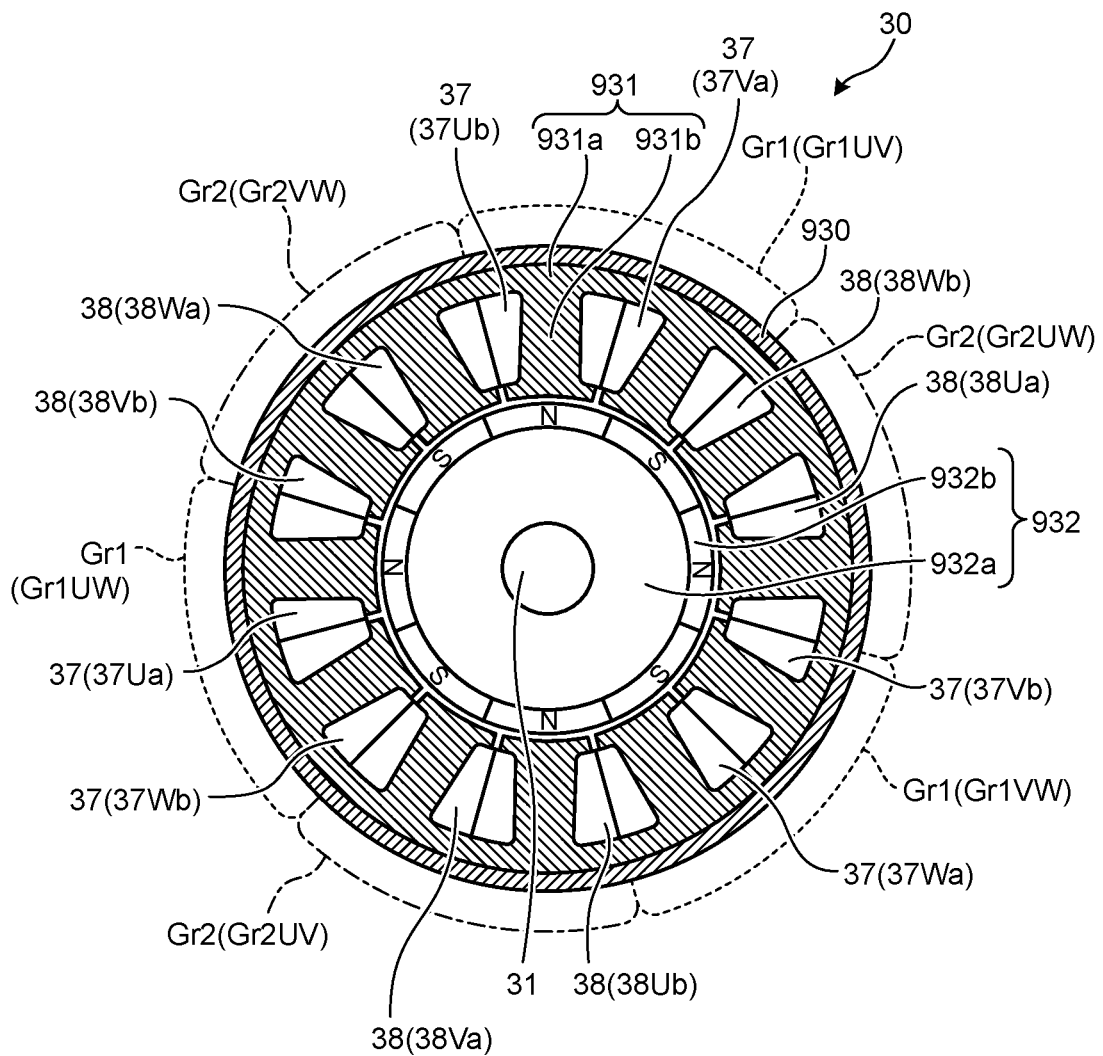
FIG. 4 is a sectional view schematically illustrating a section of a motor according to the embodiments.
Figure 5:
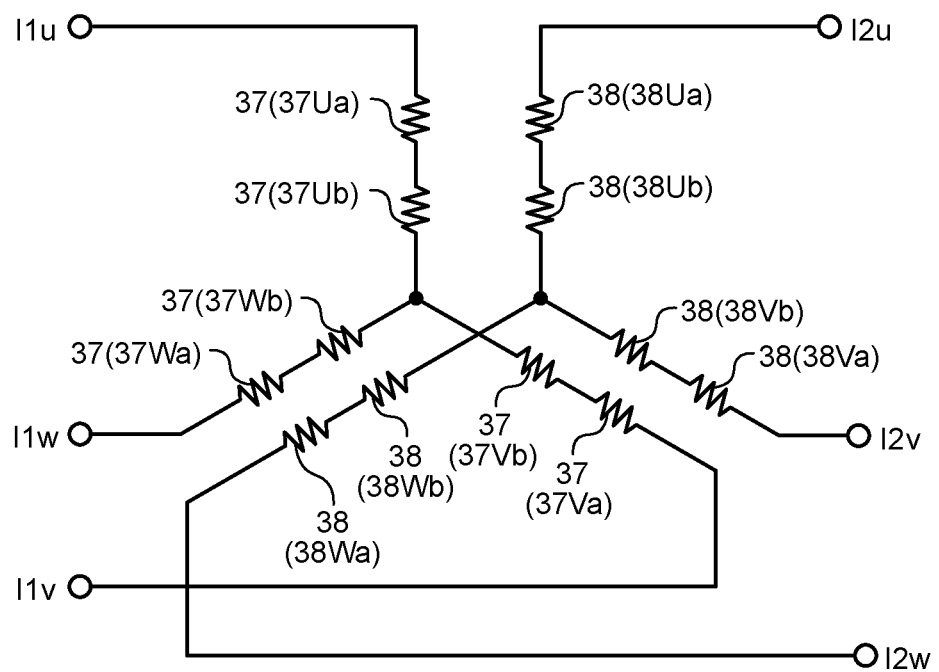
FIG. 5 is a schematic diagram illustrating wiring of the motor according to the embodiments.

FIG. 4 is a sectional view schematically illustrating a section of the motor according to the embodiments. FIG. 5 is a schematic diagram illustrating wiring of the motor according to the embodiments. As illustrated in FIG. 4, the motor 30 is provided with a housing 930, a motor stator including a stator core 931, and a motor rotor 932. The motor stator includes the stator core 931 having a cylindrical shape, a plurality of first coils 37, and a plurality of second coils 38. The stator core 931 includes a ring-shaped back yoke 931a and a plurality of teeth 931b projecting from the inner circumferential surface of the back yoke 931a. Twelve of the teeth 931b are arranged in the circumferential direction. The motor rotor 932 includes a rotor yoke 932a and magnetic poles 932b. The magnetic poles 932b are provided on the outer circumferential surface of the rotor yoke 932a. The number of the magnetic poles 932b is, for example, eight. The rotation of the motor rotor 932 is interlocked with the rotation of the shaft 31.

As illustrated in FIG. 4, each of the first coils 37 is concentratedly wound on corresponding one of the teeth 931b. The first coil 37 is concentratedly wound on the outer circumference of the tooth 931b with an insulator interposed therebetween. All the first coils 37 are included in a first coil system. The first coil system according to the embodiments is supplied with currents and excited by an inverter circuit 251 included in a first power circuit 25A (refer to FIG. 6). The first coil system includes, for example, six of the first coils 37. The six first coils 37 are arranged such that two of the first coils 37 are adjacent to each other in the circumferential direction. Three first coil groups Gr1 each obtained by grouping the adjacent first coils 37 into one group are arranged at even intervals in the circumferential direction. In other words, the first coil system includes the three first coil groups Gr1 arranged at even intervals in the circumferential direction. The number of the first coil groups Gr1 need not be three. When n denotes a natural number, 3n of the first coil groups Gr1 only need to be arranged at even intervals in the circumferential direction. The numeral of n is preferably an odd number.

As illustrated in FIG. 4, each of the second coils 38 is concentratedly wound on a corresponding one of the teeth 931b. The second coil 38 is concentratedly wound on the outer circumference of the tooth 931b with an insulator interposed therebetween. The teeth 931b with the second coils 38 concentratedly wound thereon are different ones of the teeth 931b from those of the teeth 931b with the first coils 37 concentratedly wound thereon. All the second coils 38 are included in a second coil system. The second coil system is supplied with currents and excited by the inverter circuit 251 included in a second power circuit 25B (refer to FIG. 6). The second coil system includes, for example, six of the second coils 38. The six second coils 38 are arranged such that two of the second coils 38 are adjacent to each other in the circumferential direction. Three second coil groups Gr2 each obtained by grouping the adjacent second coils 38 into one group are arranged at even intervals in the circumferential direction. In other words, the second coil system includes the three second coil groups Gr2 arranged at even intervals in the circumferential direction. The number of the second coil groups Gr2 need not be three. When n denotes a natural number, 3n of the second coil groups Gr2 only need to be arranged at even intervals in the circumferential direction. The number n is preferably an odd number. As described above, in the present embodiment, a plurality of the coil groups are provided, and are divided into at least two systems of the first coil groups Gr1 and the second coil groups Gr2 for each of three phases, and the coil groups excite the stator core 931 with three-phase alternating currents.

As illustrated in FIG. 5, the six first coils 37 include two first U-phase coils 37Ua and 37Ub excited by a first U-phase current I1u, two first V-phase coils 37Va and 37Vb excited by a first V-phase current I1v, and two first W-phase coils 37Wa and 37Wb excited by a first W-phase current I1w. The first U-phase coil 37Ub is connected in series to the first U-phase coil 37Ua. The first V-phase coil 37Vb is connected in series to the first V-phase coil 37Va. The first W-phase coil 37Wb is connected in series to the first W-phase coil 37Wa. All winding directions of the first coils 37 are the same with respect to the teeth 931b. The first U-phase coil 37Ub, the first V-phase coil 37Vb, and the first W-phase coil 37Wb are connected into a star connection (Y connection).

As illustrated in FIG. 5, the six second coils 38 include two second U-phase coils 38Ua and 38Ub excited by a second U-phase current I2u, two second V-phase coils 38Va and 38Vb excited by a second V-phase current I2v, and two second W-phase coils 38Wa and 38Wb excited by a second W-phase current I2w. The second U-phase coil 38Ub is connected in series to the second U-phase coil 38Ua. The second V-phase coil 38Vb is connected in series to the second V-phase coil 38Va. The second W-phase coil 38Wb is connected in series to the second W-phase coil 38Wa. All winding directions of the second coils 38 are the same with respect to the teeth 931b, and are the same as the winding directions of the first coils 37. The second U-phase coil 38Ub, the second V-phase coil 38Vb, and the second W-phase coil 38Wb are connected into a star connection (Y connection).

As illustrated in FIG. 4, the three first coil groups Gr1 consist of a first UV coil group Gr1UV, a first VW coil group Gr1VW, and a first UW coil group Gr1UW. The first UV coil group Gr1UV includes the first U-phase coil 37Ub and the first V-phase coil 37Va adjacent to each other in the circumferential direction. The first VW coil group Gr1VW includes the first V-phase coil 37Vb and the first W-phase coil 37Wa adjacent to each other in the circumferential direction. The first UW coil group Gr1UW includes the first U-phase coil 37Ua and the first W-phase coil 37Wb adjacent to each other in the circumferential direction.

As illustrated in FIG. 4, the three second coil groups Gr2 consist of a second UV coil group Gr2UV, a second VW coil group Gr2VW, and a second UW coil group Gr2UW. The second UV coil group Gr2UV includes the second U-phase coil 38Ub and the second V-phase coil 38Va adjacent to each other in the circumferential direction. The second VW coil group Gr2VW includes the second V-phase coil 38Vb and the second W-phase coil 38Wa adjacent to each other in the circumferential direction. The second UW coil group Gr2UW includes the second U-phase coil 38Ua and the second W-phase coil 38Wb adjacent to each other in the circumferential direction.

The first coils 37 excited by the first U-phase current I1u are opposed to the second coils 38 excited by the second U-phase current I2u in the radial direction of the stator core 931. In the following description, the radial direction of the stator core 931 is simply described as the radial direction. For example, as illustrated in FIG. 4, the first U-phase coil 37Ua is opposed to the second U-phase coil 38Ua, and the first U-phase coil 37Ub is opposed to the second U-phase coil 38Ub, in the radial direction.

The first coils 37 excited by the first V-phase current I1v are opposed to the second coils 38 excited by the second V-phase current I2v in the radial direction. For example, as illustrated in FIG. 4, the first V-phase coil 37Va is opposed to the second V-phase coil 38Va, and the first V-phase coil 37Vb is opposed to the second V-phase coil 38Vb, in the radial direction.

The first coils 37 excited by the first W-phase current I1w are opposed to the second coils 38 excited by the second W-phase current I2w in the radial direction. For example, as illustrated in FIG. 4, the first W-phase coil 37Wa is opposed to the second W-phase coil 38Wa, and the first W-phase coil 37Wb is opposed to the second W-phase coil 38Wb, in the radial direction.

Figure 6:
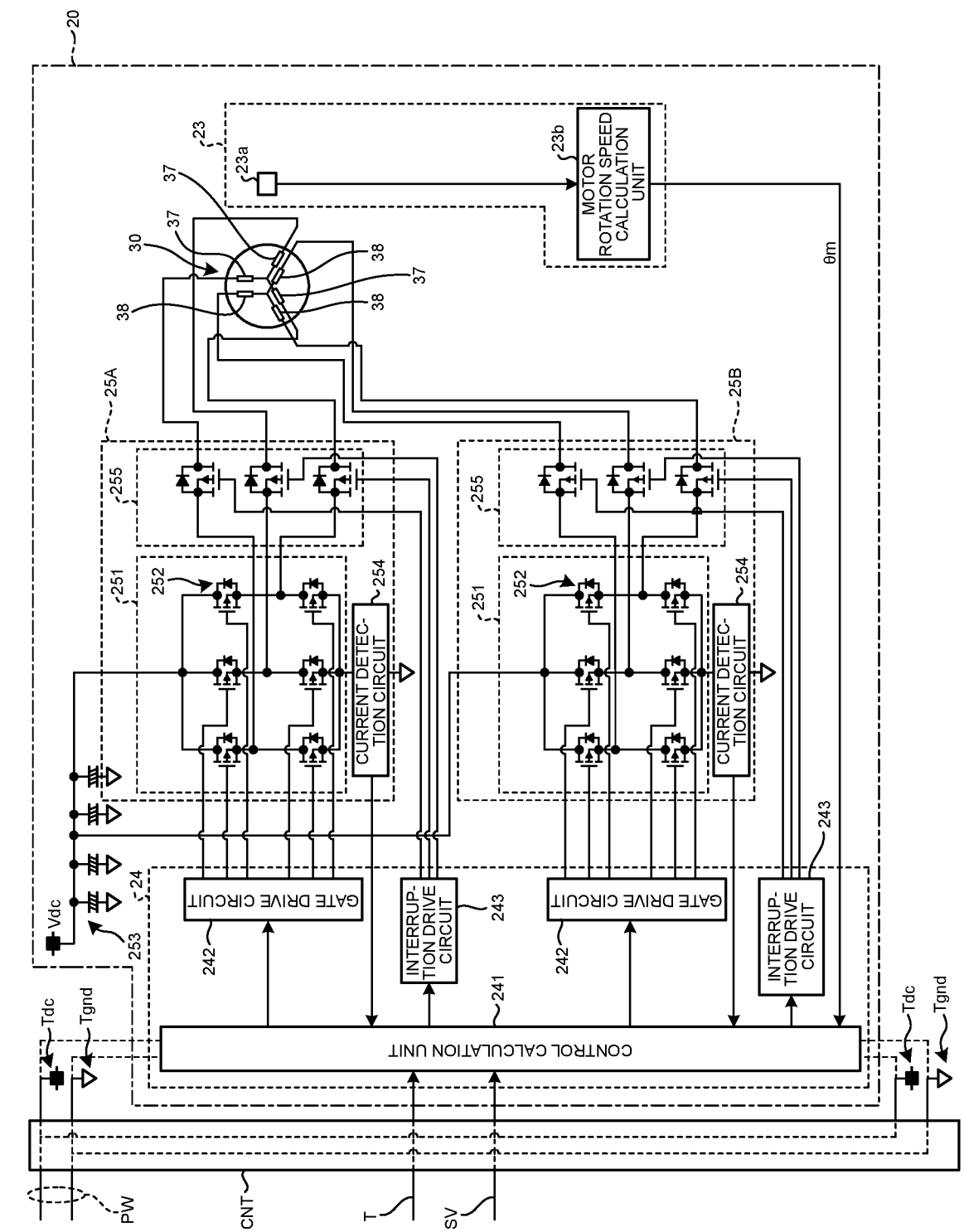
FIG. 6 is a schematic diagram illustrating a relation between the motor and the ECU according to the embodiments.

FIG. 6 is a schematic diagram illustrating a relation between the motor and the ECU according to the embodiments. As illustrated in FIG. 6, the ECU 10 is provided with a detection circuit 23, a control circuit 24, the first power circuit 25A, and the second power circuit 25B. The detection circuit 23 includes the rotation angle sensor 23a and a motor rotation speed calculation unit 23b. The control circuit 24 includes a control calculation unit 241, a gate drive circuit 242, and an interruption drive circuit 243. The first power circuit 25A includes the inverter circuit 251 and a current interruption circuit 255. The second power circuit 25B includes the inverter circuit 251 and the current interruption circuit 255. The inverter circuit 251 includes a plurality of switching elements 252 and a current detection circuit 254 for detecting current values.

The control calculation unit 241 calculates a motor current command value. The motor rotation speed calculation unit 23b calculates a motor electrical angle θm, and outputs the result to the control calculation unit 241. The gate drive circuit 242 receives the motor current command value output from the control calculation unit 241. The gate drive circuit 242 controls the first power circuit 25A and the second power circuit 25B based on the motor current command value.

As illustrated in FIG. 6, the ECU 10 is provided with the rotation angle sensor 23a. The rotation angle sensor 23a is, for example, a magnetic sensor. A detection value of the rotation angle sensor 23a is supplied to the motor rotation speed calculation unit 23b. The motor rotation speed calculation unit 23b calculates the motor electrical angle θm based on the detection value of the rotation angle sensor 23a, and outputs the result to the control calculation unit 241.

The control calculation unit 241 receives the steering torque signal T detected by the torque sensor 94, the vehicle speed signal SV serving as a signal of a vehicle speed detected by the vehicle speed sensor 82, and the motor electrical angle θm output from the motor rotation speed calculation unit 23b. The control calculation unit 241 calculates the motor current command value based on the steering torque signal T, the vehicle speed signal SV, and the motor electrical angle θm, and outputs the result to the gate drive circuit 242.

The gate drive circuit 242 calculates first pulse width modulation signals based on the motor current command value, and outputs the results to the inverter circuit 251 of the first power circuit 25A. The inverter circuit 251 switches the switching elements 252 so as to generate three-phase current values according to duty ratios of the first pulse width modulation signals, and thus generates three-phase alternating currents including the first U-phase current I1u, the first V-phase current I1v, and the first W-phase current I1w. The first U-phase current I1u excites the first U-phase coil 37Ua and the first U-phase coil 37Ub. The first V-phase current I1v excites the first V-phase coil 37Va and the first V-phase coil 37Vb. The first W-phase current I1w excites the first W-phase coil 37Wa and the first W-phase coil 37Wb.

The gate drive circuit 242 calculates second pulse width modulation signals based on the motor current command value, and outputs the results to the inverter circuit 251 of the second power circuit 25B. The inverter circuit 251 switches the switching elements 252 so as to generate three-phase current values according to duty ratios of the second pulse width modulation signals, and thus generates three-phase alternating currents including the second U-phase current I2u, the second V-phase current I2v, and the second W-phase current I2w. The second U-phase current I2u excites the second U-phase coil 38Ua and the second U-phase coil 38Ub. The second V-phase current I2v excites the second V-phase coil 38Va and the second V-phase coil 38Vb. The second W-phase current I2w excites the second W-phase coil 38Wa and the second W-phase coil 38Wb.

The inverter circuit 251 is a power conversion circuit for converting direct-current power into alternating-current power. As described above, the inverter circuit 251 includes the switching elements 252. The switching elements 252 are, for example, field-effect transistors. Smoothing capacitors 253 are connected in parallel to the inverter circuits 251. The smoothing capacitors 253 are, for example, electrolytic capacitors. A circuit board 20 is provided with a plurality of smoothing capacitors connected in parallel as the smoothing capacitors 253.

As described above, the inverter circuit 251 includes the current detection circuit 254. The current detection circuit 254 includes, for example, shunt resistors. The current values detected by the current detection circuit 254 are transmitted to the control calculation unit 241. The current detection circuit 254 may be connected so as to detect the current values of the respective phases of the motor 30.

The current interruption circuit 255 is disposed between the inverter circuit 251 and the first coils 37 or the second coils 38. If the current values detected by the current detection circuit 254 are determined to be abnormal, the control calculation unit 241 can drive the current interruption circuit 255 through the interruption drive circuit 243 to interrupt the currents flowing from the inverter circuit 251 to the first coils 37. The control calculation unit 241 can also drive the current interruption circuit 255 through the interruption drive circuit 243 to interrupt the currents flowing from the inverter circuit 251 to the second coils 38. In this way, the currents flowing to the first coils 37 and the currents flowing to the second coils 38 are controlled independently from each other by the control calculation unit 241. Input-output signals, for example, the steering torque signal T and the vehicle speed signal SV, are transmitted to the control calculation unit 241 through the connector CNT.

First Embodiment

Figure 7:
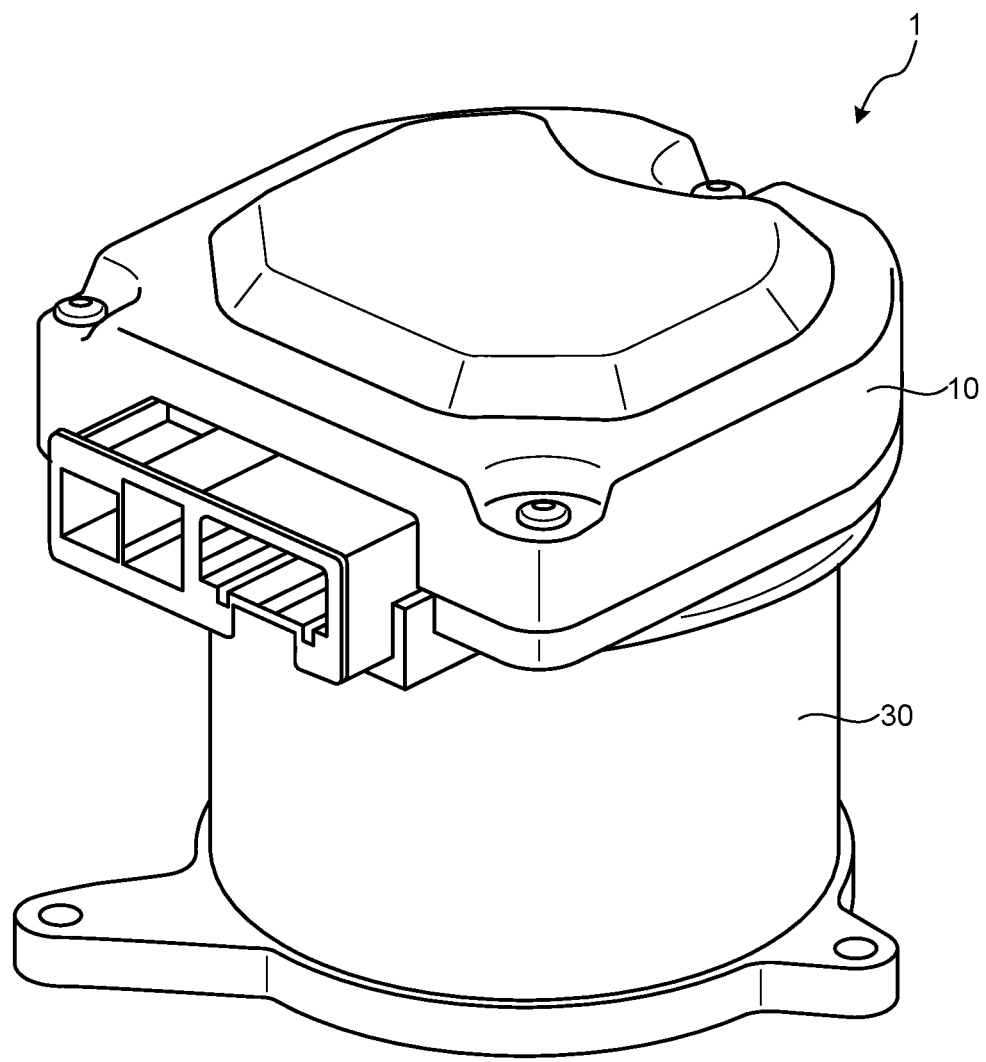
FIG. 7 is a perspective view illustrating a configuration example of an electric drive device according to a first embodiment of the present invention.
Figure 8:
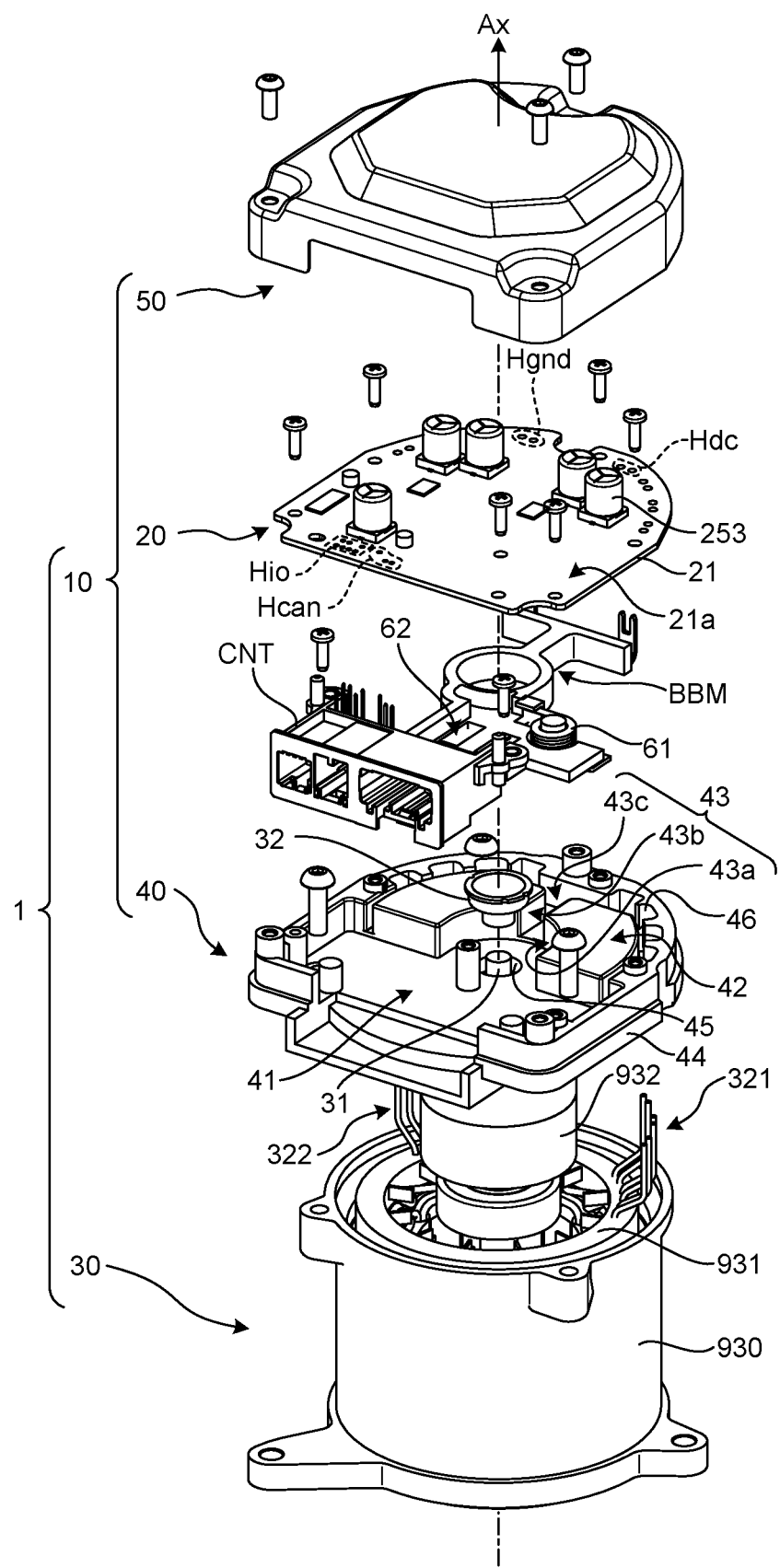
FIG. 8 is an exploded perspective view illustrating the configuration example of the electric drive device according to the first embodiment.

FIG. 7 is a perspective view illustrating a configuration example of the electric drive device according to a first embodiment of the present invention. FIG. 8 is an exploded perspective view illustrating the configuration example of the electric drive device according to the first embodiment. As illustrated in FIGS. 7 and 8, the electric drive device 1 is provided with the motor 30 and the ECU 10 disposed on the anti-load side of the motor 30. The motor 30 is provided with the housing 930. In the present embodiment, an axial direction Ax refers to a direction parallel to a direction in which the shaft 31 of the motor 30 extends. The circumferential direction refers to a direction along a concentric circle about the shaft 31 serving as the center thereof. A radial direction refers to a direction away from the shaft 31 in a plane orthogonal to the axial direction Ax. The housing 930 has a tubular shape, and accommodates therein the motor rotor 932, the stator including the first coil groups Gr1 and the second coil groups Gr2 (refer to FIG. 4), and the shaft 31.

A magnet 32 is mounted at the anti-load side end of the shaft 31. As viewed from the axial direction Ax, a half of the magnet 32 is magnetized into south poles, and another half of the magnet 32 is magnetized into north poles. Alternatively, the outer circumferential surface of the magnet 32 may have the north poles and the south poles alternately arranged as viewed in the circumferential direction.

As illustrated in FIG. 8, the ECU 10 includes the circuit board 20, a heat sink 40 that supports the circuit board 20, a bus bar module BBM integrally formed with the connector CNT, and a lid 50. The circuit board 20 and the bus bar module BBM are mounted on the heat sink 40. As viewed from the axial direction Ax, the connector CNT is disposed in a direction in which the wire harness can be inserted from and removed toward outside in the radial direction of the shaft 31 of the motor 30.

As illustrated in FIG. 8, the circuit board 20 includes a board body 21 and a plurality of electronic components mounted on the board body 21. The board body 21 is, for example, a printed-circuit board made of, for example, a resin. The electronic components mounted on one sheet of the board body 21 includes, for example, a central processing unit (CPU), application-specific integrated circuits (ASICs), field-effect transistors (FETs), a magnetic sensor, electrolytic capacitors, resistive elements, diodes, and a thermistor. These electronic components constitute the detection circuit 23, the control circuit 24, the first power circuit 25A, and the second power circuit 25B illustrated in FIG. 6.

The heat sink 40 supports the circuit board 20. The circuit board 20 is fastened to one surface (on the anti-load side) of the heat sink 40. The heat sink 40 is made of a high heat dissipation metal, such as aluminum or copper, and externally dissipates heat generated by the circuit board 20 in an efficient manner.

The lid 50 is made of a metal or a resin, and restrains foreign matter and water from getting into the electric drive device 1.

Figure 9A:
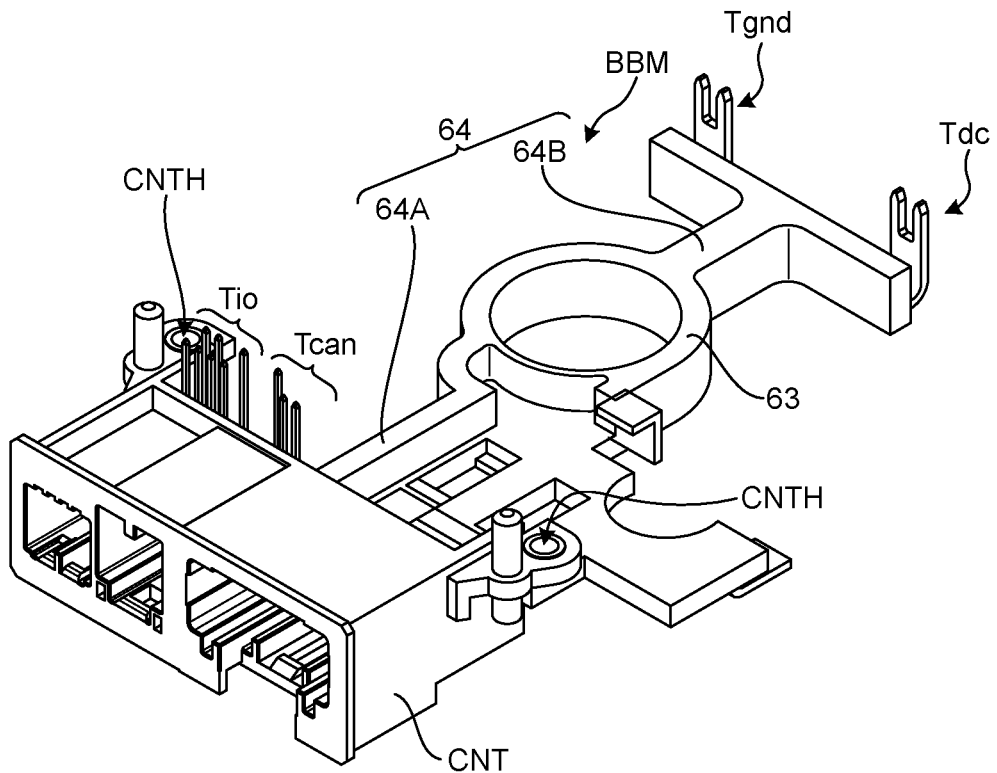
FIG. 9A is a perspective view illustrating a configuration example of a bus bar module according to the first embodiment.
Figure 9B:
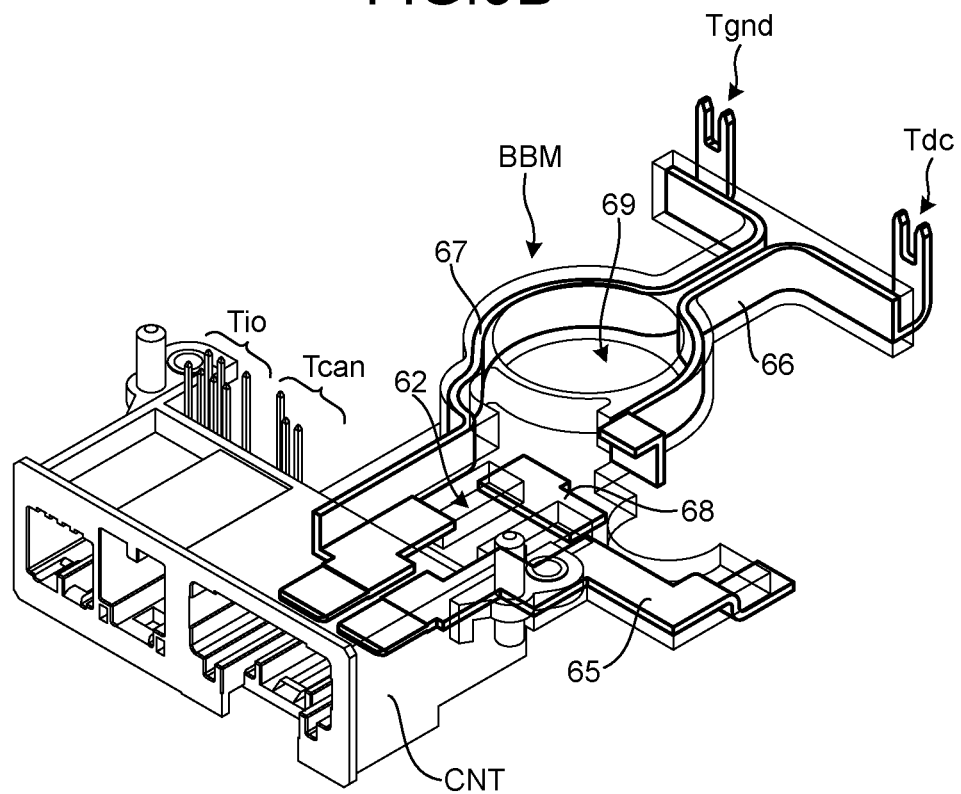
FIG. 9B is an explanatory diagram illustrating an internal configuration example of FIG. 9A.
Figure 10A:
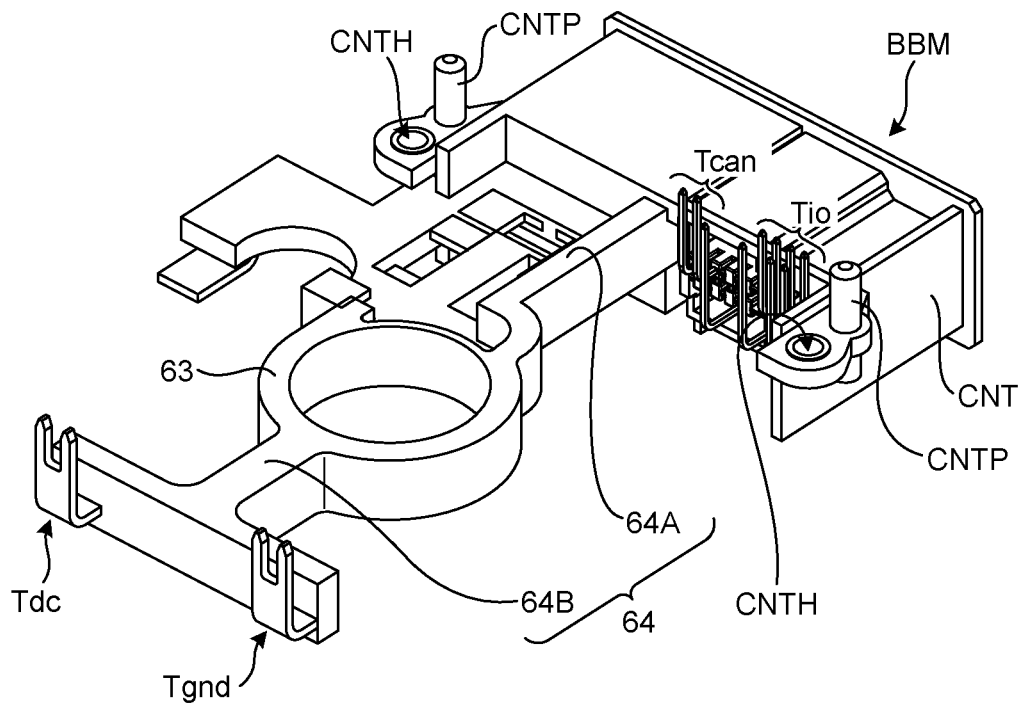
FIG. 10A is a perspective view illustrating the configuration example of the bus bar module as viewed from a direction different from that of FIG. 9A.
Figure 10B:
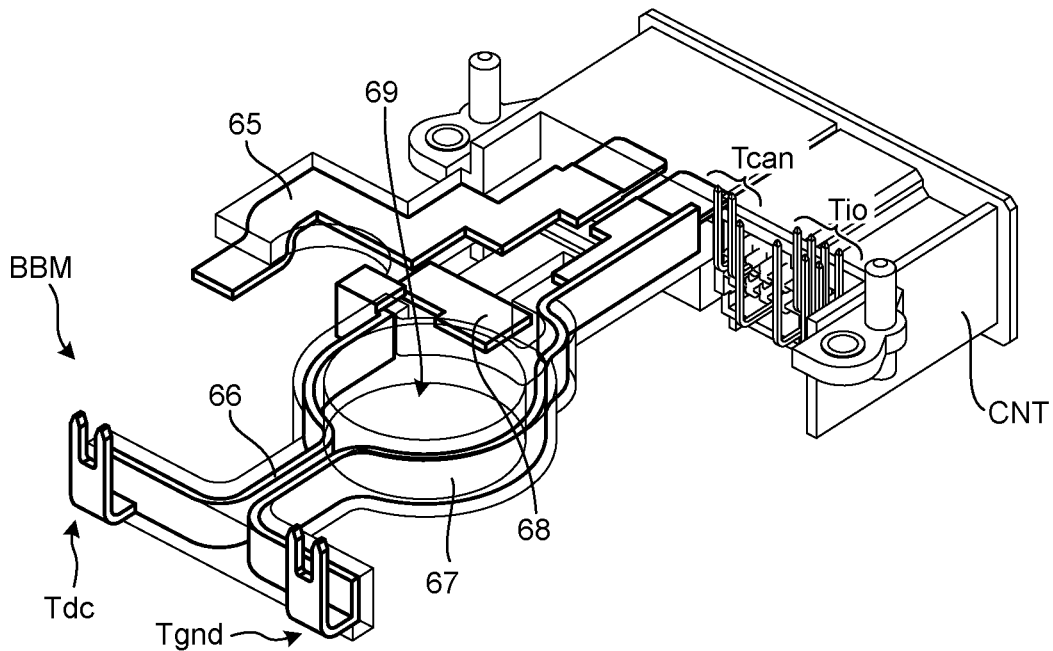
FIG. 10B is an explanatory diagram illustrating the internal configuration example of FIG. 10A.

FIG. 9A is a perspective view illustrating a configuration example of the bus bar module according to the first embodiment. FIG. 9B is an explanatory diagram illustrating an internal configuration example of FIG. 9A. FIG. 10A is a perspective view illustrating the configuration example of the bus bar module as viewed from a direction different from that of FIG. 9A. FIG. 10B is an explanatory diagram illustrating the internal configuration example of FIG. 10A. As illustrated in FIGS. 9A and 10A, the bus bar module BBM includes the connector CNT, a first bridge portion 64A, a ring-shaped portion 63, a second bridge portion 64B, power supply terminals Tdc and Tgnd, a communication terminal Tcan for performing the CAN communication, and an input-output terminal Tio for receiving and outputting data using a method other than the CAN communication.

The power supply terminal Tdc is a metal terminal for supplying a power supply voltage Vdc of the power supply device 83 (refer to FIG. 2). The power supply terminal Tgnd is a metal terminal for supplying a negative power supply voltage of the power supply device 83 (for example, a reference voltage, such as a ground voltage). Power wiring PW (refer to FIG. 2) for transmitting the power from the power supply device 83 is connected to the respective first and second power circuits 25A and 25B through the power supply terminals Tdc and Tgnd.

Each of the communication terminal Tcan and the input-output terminal Tio is a metal terminal. Signal transmission wiring for transmitting the input-output signals, for example, the steering torque signal T and the vehicle speed signal SV, is connected to the control calculation unit 241 of the control circuit 24 (refer to FIG. 6) through the communication terminal Tcan and the input-output terminal Tio.

The power supply terminal Tdc illustrated in FIG. 9A is inserted in through-holes Hdc illustrated in FIG. 8. The power supply terminal Tgnd illustrated in FIG. 9A is inserted in through-holes Hgnd illustrated in FIG. 8. The communication terminal Tcan illustrated in FIG. 9A is inserted in through-holes Hcan illustrated in FIG. 8. The input-output terminal Tio illustrated in FIG. 9A is inserted in through-holes Hio illustrated in FIG. 8.

The connector CNT is provided with rod-like positioning pins CNTP extending in the axial direction Ax. The positioning pins CNTP are inserted in positioning holes of the circuit board 20 and positioning holes of the heat sink 40. The connector CNT is provided with insert holes CNTH, through which bolts for fastening the connector CNT to the heat sink 40 are inserted.

As illustrated in FIGS. 9B and 10B, positive electrode bus bar wiring 65 and positive electrode bus bar wiring 66, negative electrode bus bar wiring 67, and a capacitor terminal plate 68 are resin-molded and embedded in the bus bar module BBM. A metal plate of, for example, copper is punched to be formed into each of the positive electrode bus bar wiring 65 and the positive electrode bus bar wiring 66, the negative electrode bus bar wiring 67, and the capacitor terminal plate 68.

A capacitor 62 is connected between the capacitor terminal plate 68 and the negative electrode bus bar wiring 67. In the same manner, another capacitor 62 is connected between the capacitor terminal plate 68 and the positive electrode bus bar wiring 65. A choke coil 61 (refer to FIG. 8) is connected between the positive electrode bus bar wiring 65 and the positive electrode bus bar wiring 66. The choke coil 61 and the capacitors 62 remove high-frequency components in the power wiring PW from the power supply device 83 described above.

As illustrated in FIGS. 9A and 10A, a bridge portion 64 includes the first bridge portion 64A and the second bridge portion 64B. The ring-shaped portion 63 is disposed between the first bridge portion 64A and the second bridge portion 64B. As viewed from the axial direction Ax, the width of each of the first bridge portion 64A and the second bridge portion 64B is smaller than that of the ring-shaped portion 63.

As illustrated in FIG. 8, the heat sink 40 is provided with a level difference between a first surface 41 and a second surface 42 on the anti-load side of a heat sink body 44, and accommodates the connector CNT on the first surface 41. The ring-shaped portion 63, the second bridge portion 64B, and the power supply terminals Tdc and Tgnd of the bus bar module BBM are disposed in a groove 43a, a groove 43b, and a groove 43c formed by the level difference between the first surface 41 and the second surface 42.

In other words, the heat sink 40 has grooves 43 on the anti-load side thereof, has the bus bar module BBM inserted in the grooves 43, and supports the circuit board 20 disposed on the anti-load side of the bus bar module BBM. The level difference between the first surface 41 and the second surface 42 is set equal to or larger than the thickness in the axial direction Ax of each of the ring-shaped portion 63 and the second bridge portion 64B of BBM, so that the bus bar module BBM does not project from the heat sink 40.

As illustrated in FIGS. 9B and 10B, the thickness in the axial direction Ax of each of the positive electrode bus bar wiring 66 and the negative electrode bus bar wiring 67 around a through-hole 69 is larger than the width thereof in a direction orthogonal to the axial direction Ax. This configuration reduces an area of the substrate occupied by the power supply wiring as viewed from the axial direction Ax, and reduces electrical resistances of the positive electrode bus bar wiring 66 and the negative electrode bus bar wiring 67 because of the thickness thereof in the axial direction Ax.

Figure 11:
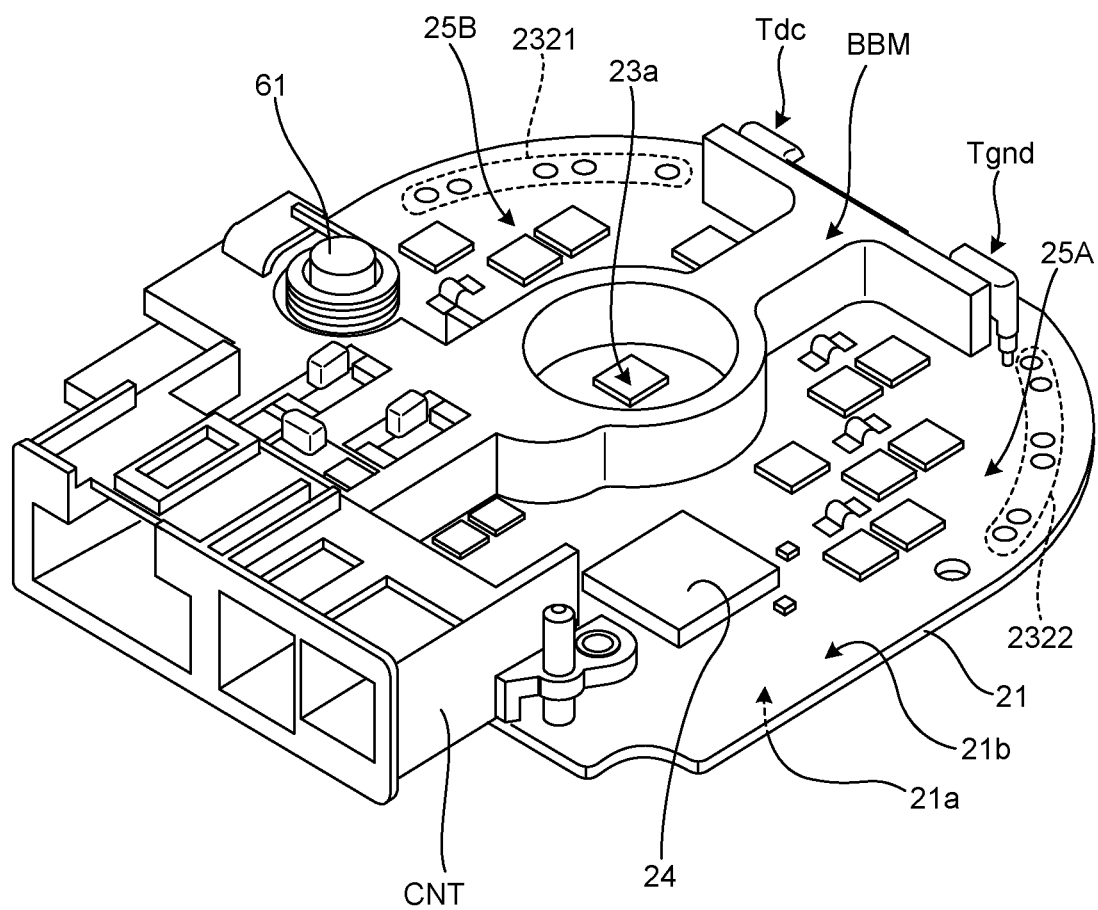
FIG. 11 is an explanatory diagram illustrating connection between the bus bar module and a circuit board according to the first embodiment.
Figure 12:
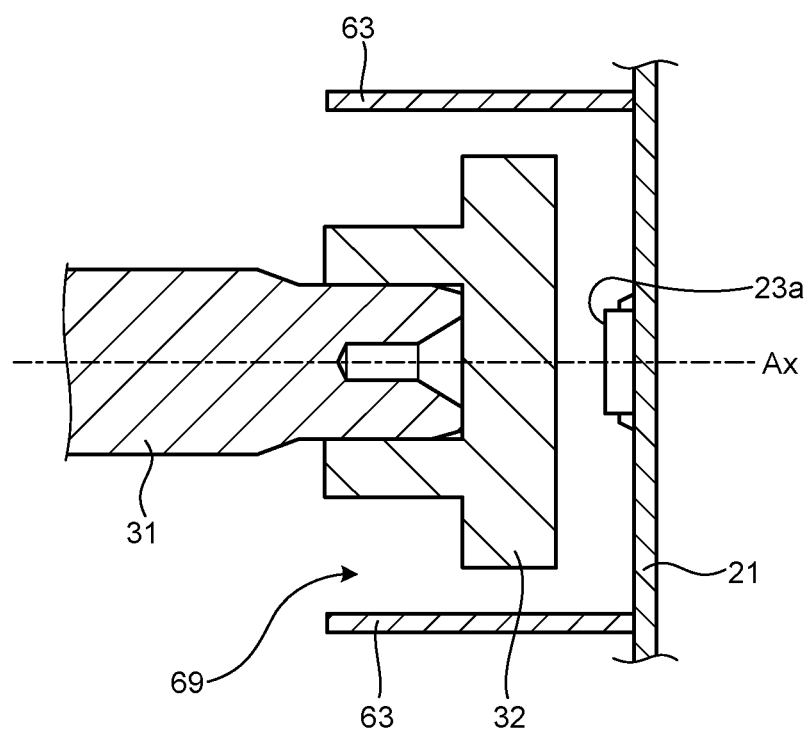
FIG. 12 is a schematic sectional view illustrating a detection circuit and a magnet according to the first embodiment.

FIG. 11 is an explanatory diagram illustrating connection between the bus bar module and the circuit board according to the first embodiment. FIG. 12 is a schematic sectional view illustrating the detection circuit and the magnet according to the first embodiment. Referring to FIGS. 8 and 11, the board body 21 has a first surface 21b and a second surface 21a located on the opposite side of the first surface 21b. The detection circuit 23, the control circuit 24, the first power circuit 25A, and the second power circuit 25B are each constituted by one or more electronic components mounted on the first surface 21b or the second surface 21a. For example, as illustrated in FIG. 11, the rotation angle sensor 23a is constituted by one electronic component mounted on the second surface 21a of the board body 21.

The control circuit 24 is constituted by a plurality of electronic components each mounted on the second surface 21a of the board body 21.

As illustrated in FIG. 11, the first power circuit 25A is constituted by a plurality of electronic components mounted on the first surface 21b of the board body 21. The circuit board 20 includes the smoothing capacitors 253 mounted on the second surface 21a of the board body 21.

In the same manner as the first power circuit 25A, the second power circuit 25B is also constituted by switching elements mounted on the first surface 21b of the board body 21. The circuit board 20 includes the smoothing capacitors 253 mounted on the second surface 21a of the board body 21.

As illustrated in FIG. 11, the board body 21 is provided with a plurality of through-holes 2321 and 2322 penetrating between the first surface 21b and the second surface 21a.

The electric drive device 1 is provided with first coil wiring 321 for connecting the first coil groups Gr1 to the circuit board 20 and second coil wiring 322 for connecting the second coil groups Gr2 to the circuit board 20. The first coil wiring 321 and the second coil wiring 322 may be included in the ECU 10, or in the motor 30.

The first coil wiring 321 (refer to FIG. 8) that has passed through a through-hole 46 of the heat sink 40 is inserted in the through-holes 2321, and the circuit board 20 is electrically connected to the first coil wiring 321. The second coil wiring 322 (refer to FIG. 8) that has passed through the through-hole 46 of the heat sink 40 is inserted in the through-holes 2322, and the circuit board 20 is electrically connected to the second coil wiring 322.

As illustrated in FIGS. 9A and 10A, the through-hole 69 with no resin therein is present in the ring-shaped portion 63. As illustrated in FIG. 8, the shaft 31 on the anti-load side of the motor 30 passes through a through-hole 45 of the heat sink 40, and is exposed through the first surface 41. The through-hole 69 is larger than the through-hole 45.

The rotation angle sensor 23a is disposed on the anti-load side of the shaft 31 on an extended line thereof extending in the axial direction Ax. A surface of the board body 21 orthogonal to the axial direction Ax serves as a mounting surface for the rotation angle sensor 23a. The rotation angle sensor 23a is mounted on the board body 21 so as to be capable of sensing a change in magnetic field of the magnet 32. The magnet 32 is preferably opposed to the rotation angle sensor 23a in the axial direction Ax.

The rotation angle sensor 23a is, for example, a spin valve sensor. The spin valve sensor is a sensor that can detect a change in direction of a magnetic flux using an element in which a nonmagnetic layer is interposed between a pin layer of a ferromagnet with a direction of magnetization fixed by, for example, an antiferromagnetic layer and a free layer of a ferromagnet. Types of the spin valve sensor include a giant magnetoresistance (GMR) sensor and a tunnel magnetoresistance (TMR) sensor. The rotation angle sensor 23a only needs to be a sensor that can detect the rotation of the magnet 32. The rotation angle sensor 23a may be, for example, an anisotropic magnetoresistance (AMR) sensor or a Hall sensor.

As illustrated in FIGS. 11 and 12, the rotation angle sensor 23a and the magnet 32 are disposed in the through-hole 69 surrounded by the ring-shaped portion 63. This configuration restrains the foreign matter from getting inside.

As described above, the electric drive device 1 according to the first embodiment is provided with the motor 30, the ECU 10 that is provided on the anti-load side of the shaft 31 to control drive of the motor 30, and the bus bar module BBM. The ECU 10 includes the magnet 32 at the anti-load side end of the shaft 31 and the circuit board 20 disposed on the anti-load side of the shaft 31 on an extended line thereof extending in the axial direction of the shaft 31 (for example, the axial direction Ax). The circuit board 20 includes the detection circuit 23 including the rotation angle sensor 23a for detecting the rotation of the magnet 32, the control circuit 24, the first power circuit 25A, and the second power circuit 25B. The rotation angle sensor 23a is the magnetic sensor that detects the rotation of the magnet 32.

In the bus bar module BBM, the connector CNT, the first power supply terminal Tdc, the second power supply terminal Tgnd, the positive electrode bus bar wiring 65 and the positive electrode bus bar wiring 66 for electrically connecting the connector CNT to the first power supply terminal Tdc, the negative electrode bus bar wiring 67 for electrically connecting the connector CNT to the second power supply terminal Tgnd are integrally formed with the connector CNT by the resin molding. This configuration reduces the number of parts. The resin molding is lightweight, and contributes to cost reduction.

The positive electrode bus bar wiring 66 and the negative electrode bus bar wiring 67 extend from the connector CNT and bypass the extended line of the shaft 31. The positive electrode bus bar wiring 66 and the negative electrode bus bar wiring 67 are connected through the first power supply terminal Tdc and the second power supply terminal Tgnd to the board body 21 at the through-holes Hdc and the through-holes Hgnd located in positions at distances from the connector CNT larger than a distance from the connector CNT to the extended line of the shaft 31. With this structure, the direction of insertion into and removal from the connector CNT is the radial direction of the shaft 31 of the motor 30 in a plane orthogonal to the axial direction Ax. This configuration can reduce the size of the electric drive device 1 in the axial direction Ax. Since the positive electrode bus bar wiring 66 and the negative electrode bus bar wiring 67 are separate from the power supply wiring of the board body 21, the first power circuit 25A and the second power circuit 25B in the board body 21 allow the area of the power supply wiring to the circuit board 20 to be reduced. As a result, the area of the board body 21 is reduced, and the circuit board 20 is reduced in size. The size of the electric drive device 1 in the radial direction is also reduced.

The bus bar module BBM is provided with the communication terminal Tcan. The communication terminal Tcan is electrically connected to the board body 21 in a position at a distance from the connector CNT smaller than the distance from the connector CNT to the extended line of the shaft 31. The control circuit 24 can be disposed so as to reduce the length of wiring from the communication terminal Tcan, and as illustrated in FIG. 11, the control circuit 24 that generates a smaller amount of heat than the first power circuit 25A and the second power circuit 25B do can easily be disposed near the connector CNT.

At least one or some of the electronic components (for example, the switching elements 252) included in the first power circuit 25A and at least one or some of the electronic components (for example, the switching elements 252) included in the second power circuit 25B are mounted on the first surface 21b of the board body 21. As illustrated in FIG. 8, the second surface 42 of the heat sink 40 can be opposed to the switching elements 252 with a heat dissipation material interposed therebetween or in a direct manner. The heat dissipation material is a material obtained by mixing a silicone polymer with a thermally conductive filler, and is called a thermal interface material (TIM). As a result, the heat generated in the first power circuit 25A and the second power circuit 25B can be more effectively dissipated.

The electric power steering device 100 is provided with the above-described electric drive device 1, and the electric drive device 1 generates the steering assist torque. This configuration reduces the size of the motor 30 in the axial direction Ax parallel to the shaft 31 and in the radial direction of the shaft 31, and increases the degree of freedom of layout of the electric power steering device 100.

Second Embodiment

Figure 13:
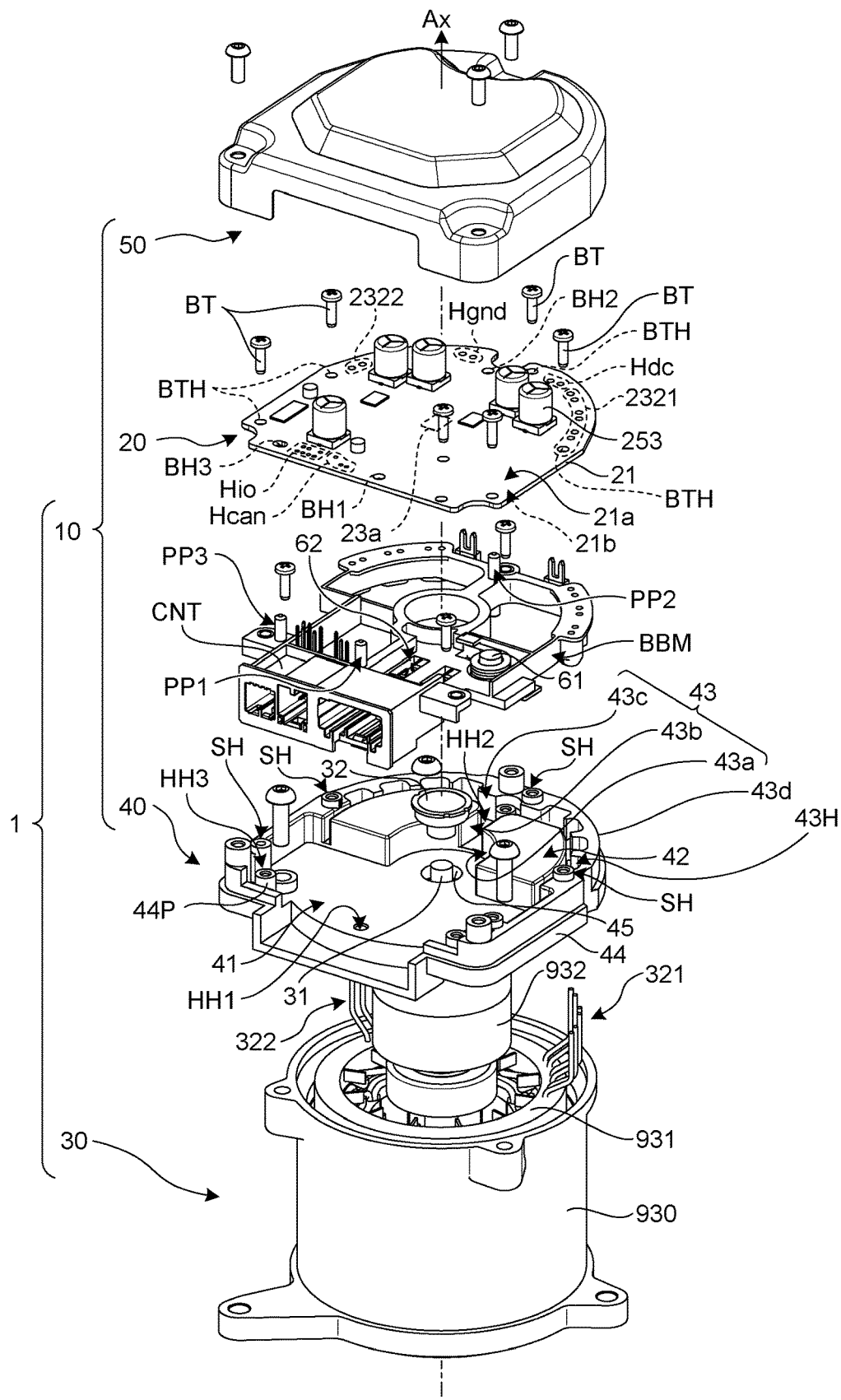
FIG. 13 is an exploded perspective view illustrating a configuration example of the electric drive device according to a second embodiment of the present invention.
Figure 14A:
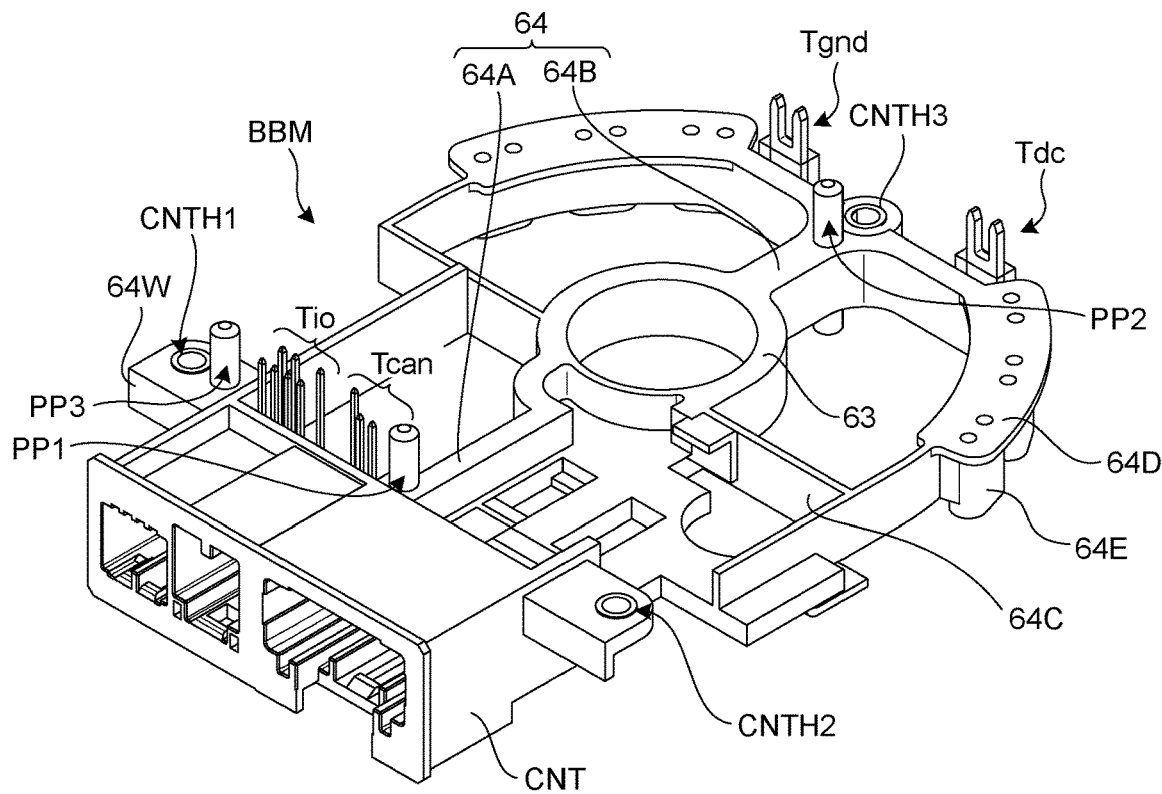
FIG. 14A is a perspective view illustrating a configuration example of the bus bar module according to the second embodiment.
Figure 14B:
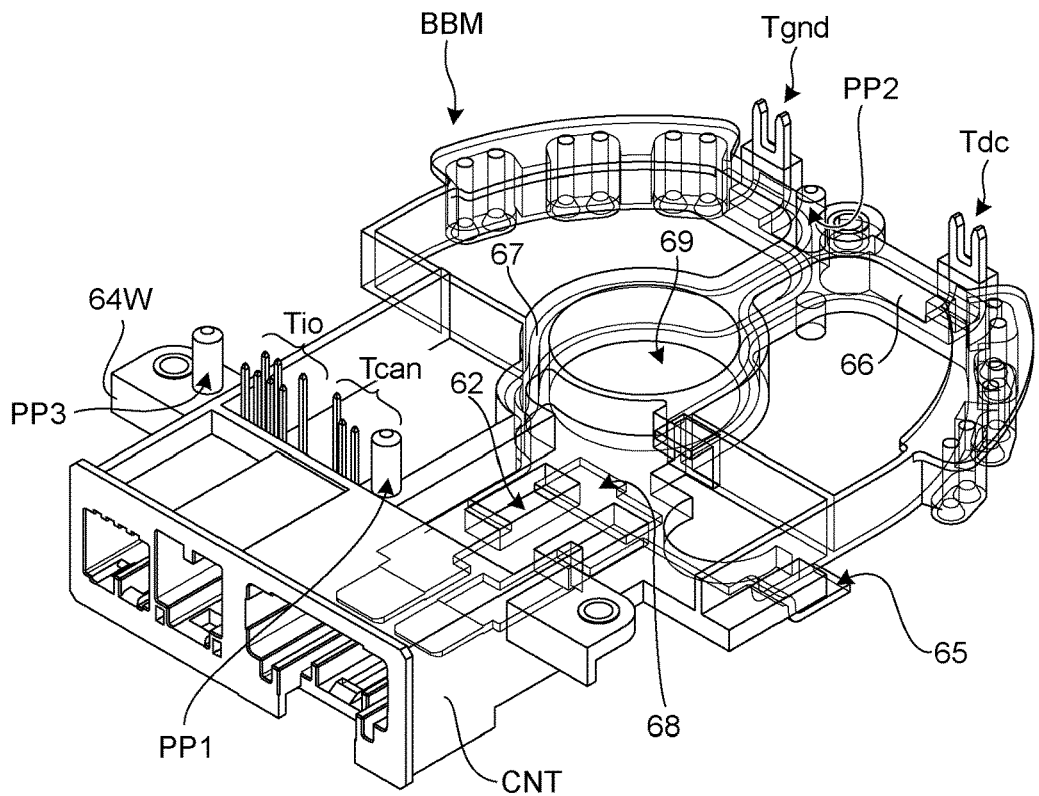
FIG. 14B is an explanatory diagram illustrating an internal configuration example of FIG. 14A.
Figure 15:
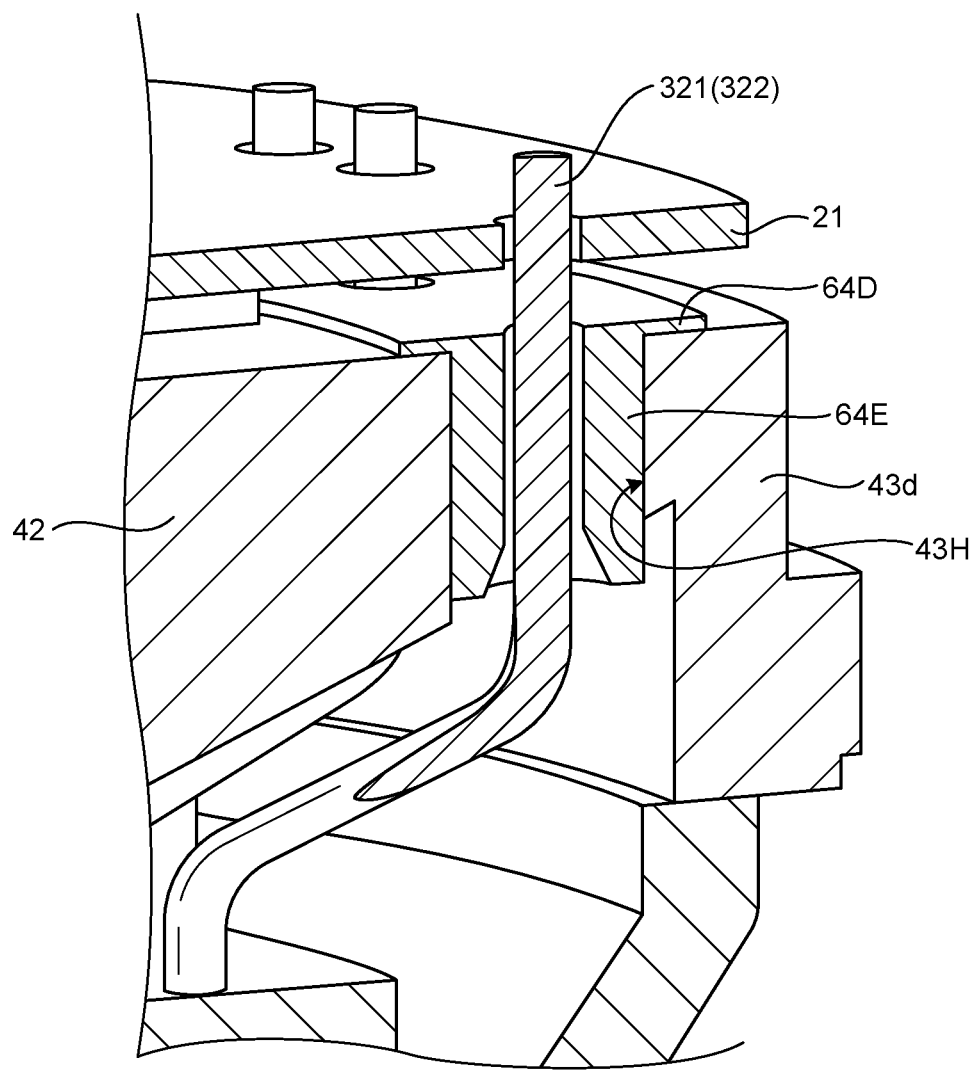
FIG. 15 is a sectional view for explaining a through-hole of a heat sink in which a guide portion of the bus bar module is fitted.

FIG. 13 is an exploded perspective view illustrating a configuration example of the electric drive device according to a second embodiment of the present invention. FIG. 14A is a perspective view illustrating a configuration example of the bus bar module according to the second embodiment. FIG. 14B is an explanatory diagram illustrating an internal configuration example of FIG. 14A. FIG. 15 is a sectional view for explaining a through-hole of the heat sink in which a guide portion of the bus bar module is fitted. FIG. 16 is a sectional view for explaining a through-hole of the guide portion of the bus bar module. The same components as those described in the above-described first embodiment are denoted by the same reference numerals, and the description thereof will not be repeated.

In the electric drive device of each of Patent Literature 1 to Patent Literature 3, coil wiring from the motor passes through the heat sink. Therefore, electrical insulation properties between the heat sink and the coil wiring are required to be ensured.

As illustrated in FIGS. 14A and 14B, the bus bar module BBM includes the connector CNT, the first bridge portion 64A, the ring-shaped portion 63, the second bridge portion 64B, a frame portion 64C, a jaw portion 64D, a guide portion 64E, the first power supply terminal Tdc, the second power supply terminal Tgnd, the communication terminal Tcan for performing the CAN communication, and the input-output terminal Tio for receiving and outputting data using a method other than the CAN communication.

The first power supply terminal Tdc is a metal terminal for supplying the power supply voltage Vdc of the power supply device 83 (refer to FIG. 2). The second power supply terminal Tgnd is a metal terminal for supplying the negative power supply voltage of the power supply device 83 (for example, the reference voltage, such as the ground voltage). The power wiring PW (refer to FIG. 2) for transmitting the power from the power supply device 83 is connected to the first power circuit 25A and the second power circuit 25B through the first power supply terminal Tdc and the second power supply terminal Tgnd.

Each of the communication terminal Tcan and the input-output terminal Tio is a metal terminal. The signal transmission wiring for transmitting the input-output signals, for example, the steering torque signal T and the vehicle speed signal SV, is connected to the control calculation unit 241 of the control circuit 24 (refer to FIG. 6) through the communication terminal Tcan and the input-output terminal Tio.

The first power supply terminal Tdc illustrated in FIG. 14A is inserted in the through-holes Hdc illustrated in FIG. 13. The second power supply terminal Tgnd illustrated in FIG. 14A is inserted in the through-holes Hgnd illustrated in FIG. 13. The communication terminal Tcan illustrated in FIG. 14A is inserted in the through-holes Hcan illustrated in FIG. 13. The input-output terminal Tio illustrated in FIG. 14A is inserted in the through-holes Hio illustrated in FIG. 13.

As illustrated in FIG. 14B, the positive electrode bus bar wiring 65 and the positive electrode bus bar wiring 66, the negative electrode bus bar wiring 67, and the capacitor terminal plate 68 are resin-molded and embedded in the bus bar module BBM. A metal plate of, for example, copper is punched to be formed into each of the positive electrode bus bar wiring 65 and the positive electrode bus bar wiring 66, the negative electrode bus bar wiring 67, and the capacitor terminal plate 68. The resin of the bus bar module BBM is, for example, polybutylene terephthalate (PBT).

One of the capacitors 62 is connected between the capacitor terminal plate 68 and the negative electrode bus bar wiring 67. In the same manner, the other of the capacitors 62 is connected between the capacitor terminal plate 68 and the positive electrode bus bar wiring 65. The choke coil 61 (refer to FIG. 13) is connected between the positive electrode bus bar wiring 65 and the positive electrode bus bar wiring 66. The choke coil 61 and the capacitors 62 remove the high-frequency components in the power wiring PW from the power supply device 83 described above.

As illustrated in FIG. 14A, the bridge portion 64 includes the first bridge portion 64A and the second bridge portion 64B. The ring-shaped portion 63 is disposed between the first bridge portion 64A and the second bridge portion 64B. As viewed from the axial direction Ax, the width of each of the first bridge portion 64A and the second bridge portion 64B is smaller than that of the ring-shaped portion 63.

The frame portion 64C, the second bridge portion 64B, and the ring-shaped portion 63 surround a raised portion having the second surface 42 raised from the first surface 41 at a bottom of the groove 43a. The frame portion 64C reduces torsion of the bus bar module BBM, and facilitates handling during assembly. The guide portion 64E thicker than the frame portion 64C in the radial direction is provided outside the frame portion 64C. A top surface of the guide portion 64E is provided with the jaw portion 64D, which juts out from the guide portion 64E at least in the radial direction.

The bus bar module BBM is provided with jutting portions 64W jutting from both side surfaces of the connector CNT in directions away from each other. The jutting portions 64W are provided with an insert hole CNTH1 and an insert hole CNTH2 for inserting screws. The second bridge portion 64B is provided with an insert hole CNTH3 for inserting a screw.

As illustrated in FIG. 13, the heat sink 40 is provided with a level difference between the first surface 41 and the second surface 42 on the anti-load side of the heat sink body 44, and accommodates the connector CNT on the first surface 41. The ring-shaped portion 63, the second bridge portion 64B, and the first and the second power supply terminals Tdc and Tgnd of the bus bar module BBM are disposed in the groove 43a, the groove 43b, and the groove 43c formed by the level difference between the first surface 41 and the raised portion of the second surface 42.

In other words, the heat sink 40 has the grooves 43 on the anti-load side thereof, has the bus bar module BBM inserted in the grooves 43, and supports the circuit board 20 disposed on the anti-load side of the bus bar module BBM. The level difference between the first surface 41 and the second surface 42 is set equal to or larger than the thickness in the Ax direction of each of the ring-shaped portion 63 and the second bridge portion 64B of the bus bar module BBM, so that the bus bar module BBM does not project from the heat sink 40.

The thickness in the axial direction Ax of each of the positive electrode bus bar wiring 66 and the negative electrode bus bar wiring 67 around the through-hole 69 is larger than the width of each of the positive electrode bus bar wiring 66 and the negative electrode bus bar wiring 67 in the direction orthogonal to the axial direction Ax. This configuration reduces an area of the substrate occupied by the power supply wiring as viewed from the axial direction Ax, and reduces the electrical resistances of the positive electrode bus bar wiring 66 and the negative electrode bus bar wiring 67 because of the thickness thereof in the axial direction Ax.

Referring to FIG. 13, the board body 21 has the first surface 21b and the second surface 21a located on the opposite side of the first surface 21b. The detection circuit 23, the control circuit 24, the first power circuit 25A, and the second power circuit 25B illustrated in FIG. 6 are each constituted by one or more electronic components mounted on the first surface 21b or the second surface 21a. For example, as illustrated in FIG. 13, the rotation angle sensor 23a is constituted by one electronic component mounted on the second surface 21a of the board body 21.

The control circuit 24 illustrated in FIG. 6 is constituted by a plurality of electronic components each mounted on the first surface 21b of the board body 21.

The circuit board 20 includes the smoothing capacitors 253 mounted on the second surface 21a of the board body 21.

As illustrated in FIG. 13, the board body 21 is provided with the through-holes 2321 and 2322 passing through between the first surface 21b and the second surface 21a.

As illustrated in FIG. 13, the electric drive device 1 is provided with the first coil wiring 321 for connecting the first coil groups Gr1 to the circuit board 20 and the second coil wiring 322 for connecting the second coil groups Gr2 to the circuit board 20. The first coil wiring 321 and the second coil wiring 322 may be included in the ECU 10, or in the motor 30.

The first coil wiring 321 that has passed through the through-hole 46 of the heat sink 40 is inserted in the through-holes 2321, and the circuit board 20 is electrically connected to the first coil wiring 321. The second coil wiring 322 that has passed through the through-hole 46 of the heat sink 40 is inserted in the through-holes 2322, and the circuit board 20 is electrically connected to the second coil wiring 322.

As illustrated in FIGS. 14A and 14B, the through-hole 69 with no resin therein is present in the ring-shaped portion 63. As illustrated in FIG. 13, the shaft 31 on the anti-load side of the motor 30 passes through the through-hole 45 of the heat sink 40, and is exposed through the first surface 41. The through-hole 69 is larger than the through-hole 45.

The rotation angle sensor 23a is disposed on the anti-load side of the shaft 31 on the extended line thereof extending in the axial direction Ax. A surface of the board body 21 orthogonal to the axial direction Ax serves as the mounting surface for the rotation angle sensor 23a. The rotation angle sensor 23a is mounted on the board body 21 so as to be capable of sensing a change in magnetic field of the magnet 32. The magnet 32 is preferably opposed to the rotation angle sensor 23a in the axial direction Ax.

The rotation angle sensor 23a is, for example, a spin valve sensor. The spin valve sensor is a sensor that can detect a change in direction of a magnetic flux using an element in which a nonmagnetic layer is interposed between a pin layer of a ferromagnet with a direction of magnetization fixed by, for example, an antiferromagnetic layer and a free layer of a ferromagnet. Types of the spin valve sensor include the GMR sensor and the TMR sensor. The rotation angle sensor 23a only needs to be a sensor that can detect the rotation of the magnet 32. The rotation angle sensor 23a may be, for example, an AMR sensor or a Hall sensor.

Referring to FIG. 12 described above, the rotation angle sensor 23a and the magnet 32 are disposed in the through-hole 69 surrounded by the ring-shaped portion 63. This configuration restrains the foreign matter from getting inside.

As illustrated in FIG. 13, a through-hole 43H for accommodating the guide portion 64E of the bus bar module BBM is provided between the raised portion of the second surface 42 and a rim portion 43d on the outer circumference of the heat sink 40. As illustrated in FIG. 15, after the guide portion 64E of the bus bar module BBM is inserted in the through-hole 43H, the jaw portion 64D of the bus bar module BBM is supported by the raised portion of the second surface 42 and the rim portion 43d.

As illustrated in FIG. 16, through-holes HB overlapping the through-holes 2321 and 2322 of the board body 21 are formed in the guide portion 64E.

An opening center Hx of each of the through-holes HB is parallel to the axial direction Ax. An inner wall HBA of the through-hole HB has a constant diameter DA. The through-hole HB has an opening having a diameter DB larger than the diameter DA at an end on the load side of the through-hole HB, and has a tapered inner wall HBT having a diameter gradually decreasing from the diameter DB to the diameter DA as the depth increases from the end on the motor stator side. In other words, the tapered inner wall HBT gradually becomes smaller in diameter from the diameter DB to the diameter DA as the depth increases from the load side toward the anti-load side.

In the state where the guide portion 64E is accommodated in the through-hole 43H, the board body 21 is placed in a state of being fixed to the bus bar module BBM in advance. Then, the first and the second coil wiring 321 and 322 illustrated in FIG. 13 are inserted in the through-holes HB (refer to FIG. 16). Each wire of the first and the second coil wiring 321 and 322 is guided by the tapered inner wall HBT (refer to FIG. 16) to extend along the opening center Hx. As a result, each wire of the first coil wiring 321 centered at the opening center Hx is inserted in a corresponding one of the through-holes 2321; each wire of the second coil wiring 322 centered at the opening center Hx is inserted in a corresponding one of the through-holes 2322; and the first coil wiring 321 and the second coil wiring 322 are electrically connected to internal circuitry of the board body 21 in a reliable manner. This configuration improves ease of assembly.

In order to electrically connect the first and the second coil wiring 321 and 322 to the circuitry located in the board body 21 using soldering or press fitting, conductors are often exposed at ends of the first and the second coil wiring 321 and 322. Although the first and the second coil wiring 321 and 322 pass through the heat sink 40, an insulating resin of the guide portion 64E is present between the first and the second coil wiring 321 and 322 and the heat sink 40, so that the electrical insulation properties can be endured. In this way, the first and the second coil wiring 321 and 322 pass through the heat sink 40 with the resin of the bus bar module BBM interposed between the wires thereof, and are electrically connected to the board body 21.

Third Embodiment

Figure 18A:
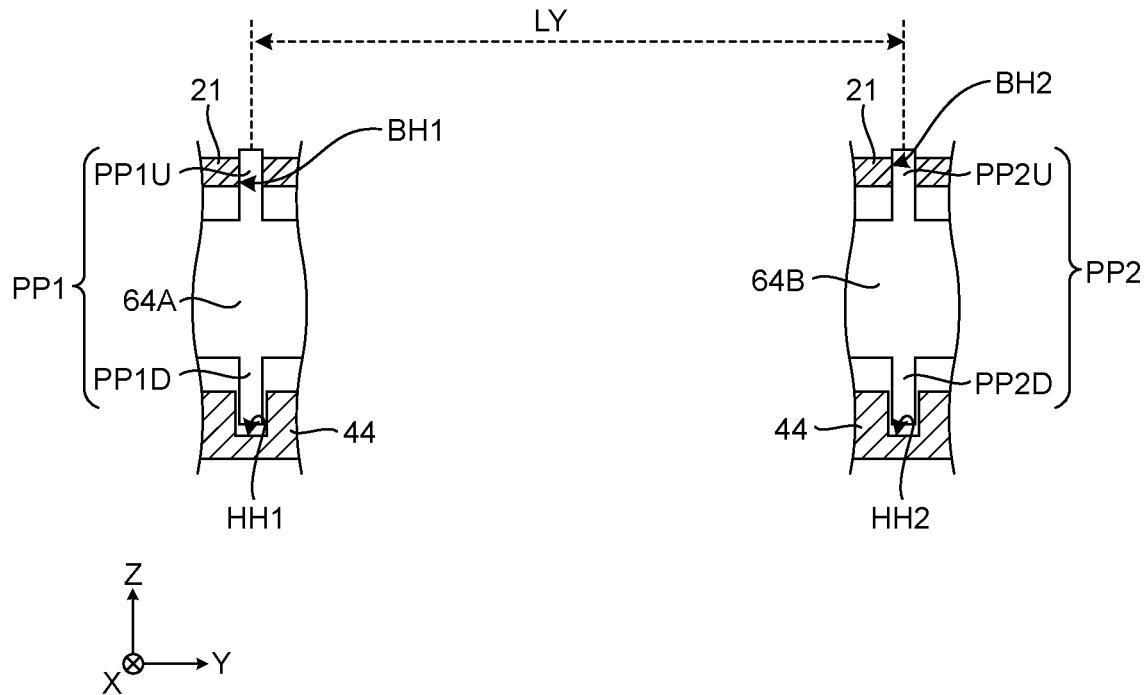
FIG. 18A is a sectional view for explaining one section of the positioning portions of the bus bar module.
Figure 18B:
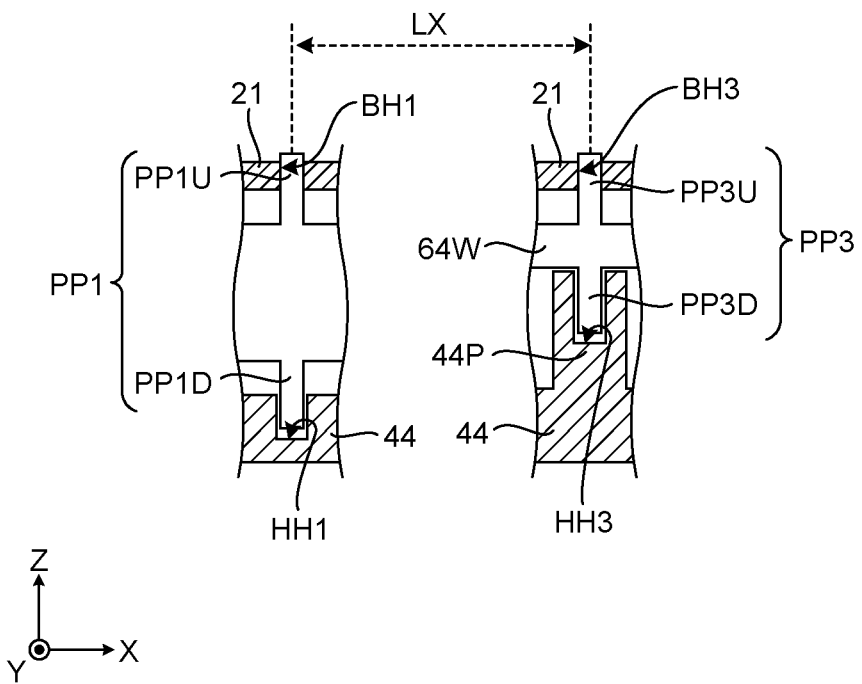
FIG. 18B is a sectional view for explaining another section of the positioning portions of the bus bar module.
Figure 19:
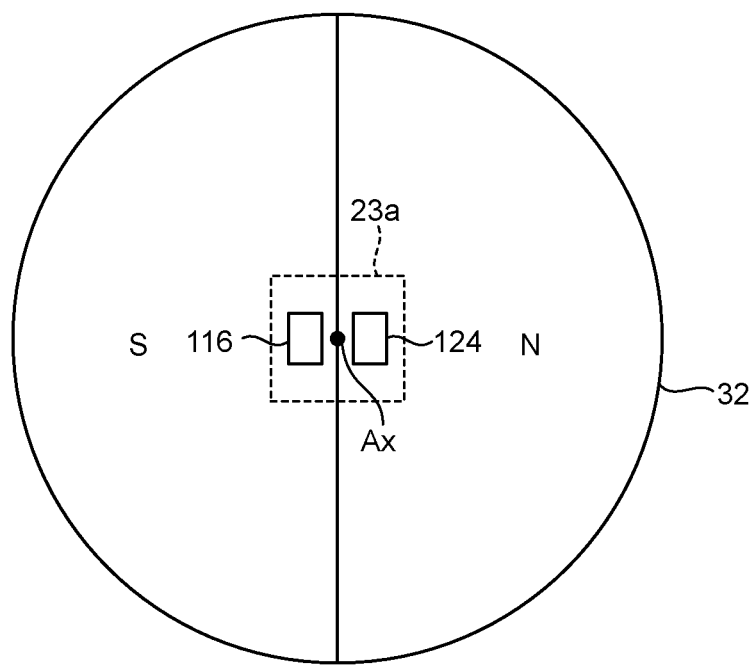
FIG. 19 is an explanatory diagram illustrating positional relations of a permanent magnet with a first sensor and a second sensor according to a third embodiment of the present invention.
Figure 20:
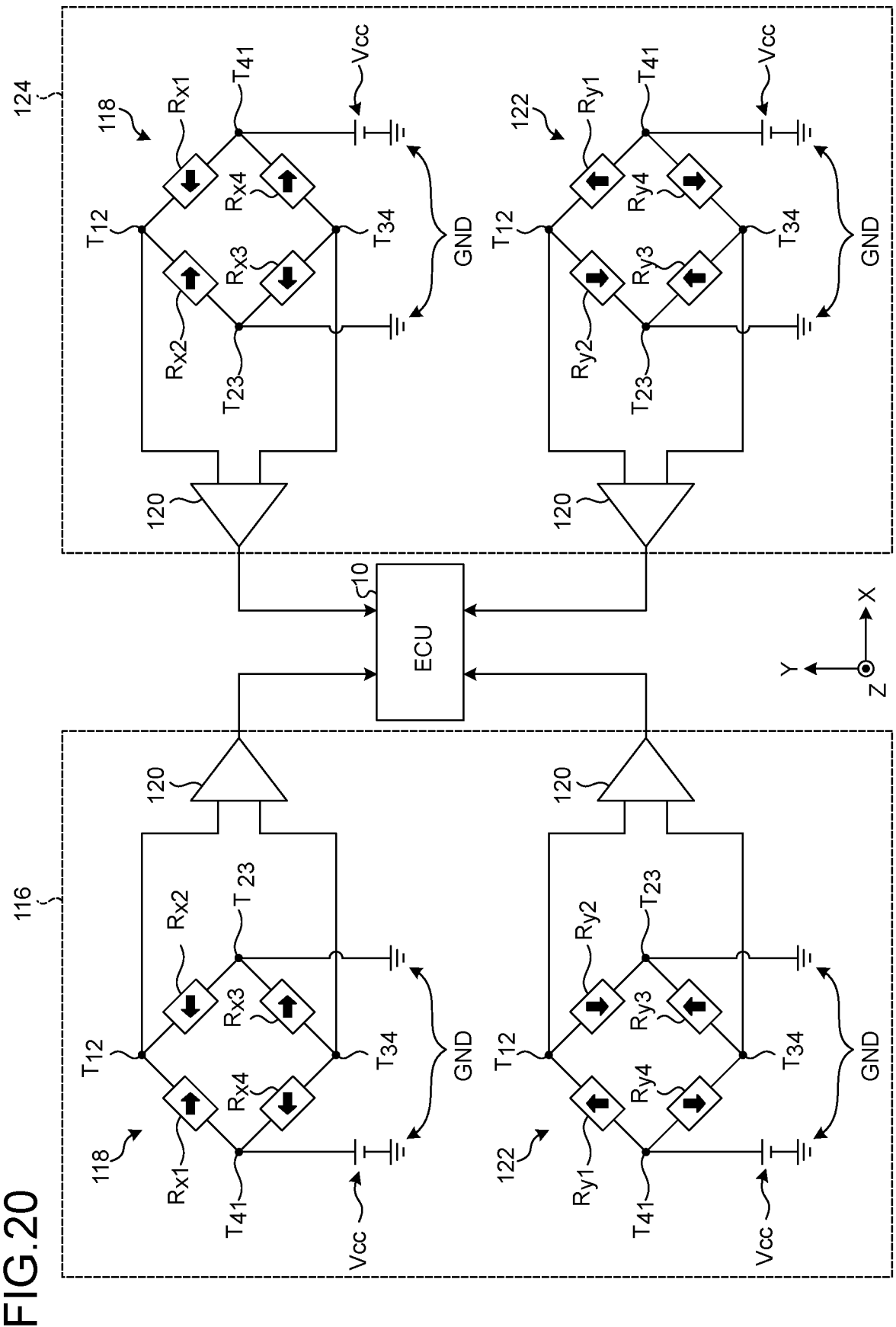
FIG. 20 is a circuit diagram illustrating a circuit configuration of a sensor chip according to the third embodiment.

FIG. 17 is a plan view for explaining planar positions of positioning portions of the bus bar module. FIG. 18A is a sectional view for explaining one section of the positioning portions of the bus bar module. FIG. 18B is a sectional view for explaining another section of the positioning portions of the bus bar module. FIG. 19 is an explanatory diagram illustrating positional relations of the permanent magnet with a first sensor and a second sensor according to a third embodiment of the present invention. FIG. 20 is a circuit diagram illustrating a circuit configuration of a sensor chip according to the third embodiment. The same components as those described in the above-described first or second embodiment are denoted by the same reference numerals, and the description thereof will not be repeated.

In the first embodiment, the board body 21 is mounted on the bus bar module BBM integrated with the connector CNT to reduce the size of the motor in the axial direction parallel to the shaft and in the radial direction of the shaft. However, if the board is fastened to the heat sink using bolts or the like and the bus bar module is fixed simply by being sandwiched between the board and the heat sink, the position of the bus bar module may vary with respect to the heat sink. The electric drive device according to the third embodiment increases positional accuracy of the bus bar module with respect to the heat sink while reducing the size of the motor in the axial direction parallel to the shaft and in the radial direction of the shaft.

As illustrated in FIG. 13, the board body 21 is provided with the through-holes 2321 and 2322 passing through between the first surface 21b and the second surface 21a.

The circuit board 20 is fastened to the heat sink 40 using fasteners BT such as bolts. The fasteners BT pass through through-holes BTH of the circuit board 20, and are fastened to internal threaded holes SH of the heat sink 40.

The bus bar module BBM is provided with a first positioning portion PP1, a second positioning portion PP2, and a third positioning portion PP3, each having a cylindrical shape. The bus bar module BBM is provided with the jutting portions 64W jutting from both side surfaces of the connector CNT in directions away from each other. The jutting portions 64W are provided with the insert hole CNTH1 and the insert hole CNTH2 for inserting screws.

As illustrated in FIG. 13, the heat sink 40 is provided with a level difference between the first surface 41 and the second surface 42 on the anti-load side of the heat sink body 44, and accommodates the connector CNT on the first surface 41. The ring-shaped portion 63, the second bridge portion 64B, the first power supply terminal Tdc, and the second power supply terminal Tgnd of the bus bar module BBM are disposed in the groove 43a, the groove 43b, and the groove 43c formed by the level difference between the first surface 41 and the second surface 42.

As illustrated in FIG. 17, a distance LY is present between the first positioning portion PP1 and the second positioning portion PP2, and a distance LX is present between the first positioning portion PP1 and the third positioning portion PP3.

As illustrated in FIGS. 18A and 18B, the first positioning portion PP1 includes a board positioning pin PP1U that projects from a top surface of the first bridge portion 64A to the board body 21 and extends in a Z-direction parallel to the axial direction Ax, and includes a fixation positioning pin PP1D that projects from a bottom surface of the first bridge portion 64A to the heat sink body 44 and extends in the Z-direction. The board positioning pin PP1U projects in a direction opposite to that of the fixation positioning pin PP1D. The board positioning pin PP1U and the fixation positioning pin PP1D are integrally formed with the first bridge portion 64A by the resin molding. The fixation positioning pin PP1D is press-fitted into a positioning hole HH1 (refer to FIG. 13) formed in the heat sink body 44. The board positioning pin PP1U is press-fitted into a positioning hole BH1 (refer to FIG. 13) formed in the board body 21. The board positioning pin PP1U penetrates the circuit board 20 from the bus bar module BBM.

As illustrated in FIG. 18A, the second positioning portion PP2 includes a board positioning pin PP2U that projects from a top surface of the second bridge portion 64B to the board body 21 and extends in the Z-direction, and includes a fixation positioning pin PP2D that projects from a bottom surface of the second bridge portion 64B to the heat sink body 44 and extends in the Z-direction. The board positioning pin PP2U projects in a direction opposite to that of the fixation positioning pin PP2D. The board positioning pin PP2U and the fixation positioning pin PP2D are integrally formed with the second bridge portion 64B by the resin molding. The fixation positioning pin PP2D is press-fitted into a positioning hole HH2 (refer to FIG. 13) formed in the heat sink body 44. The board positioning pin PP2U is press-fitted into a positioning hole BH2 (refer to FIG. 13) formed in the board body 21. The board positioning pin PP2U penetrates the circuit board 20 from the bus bar module BBM.

As illustrated in FIG. 18B, the third positioning portion PP3 includes a board positioning pin PP3U that projects from a top surface of one of the jutting portions 64W to the board body 21 and extends in the Z-direction, and includes a fixation positioning pin PP3D that projects from a bottom surface of the jutting portion 64W to the heat sink body 44 and extends in the Z-direction. The board positioning pin PP3U projects in a direction opposite to that of the fixation positioning pin PP3D. The board positioning pin PP3U and the fixation positioning pin PP3D are integrally formed with the jutting portion 64W by the resin molding. The fixation positioning pin PP3D is press-fitted into a positioning hole HH3 (refer to FIG. 13) formed in a projecting portion 44P of the heat sink body 44. The projecting portion 44P is also called, for example, a boss. The board positioning pin PP3U is press-fitted into a positioning hole BH3 (refer to FIG. 13) formed in the board body 21. The board positioning pin PP3U penetrates the circuit board 20 from the bus bar module BBM.

The projecting portion 44P abuts on the jutting portion 64W of the bus bar module BBM, and the bus bar module BBM is accurately positioned in the Z-direction.

The fixation positioning pins PP1D, PP2D, and PP3D fix the bus bar module BBM to the heat sink 40. The board positioning pins PP1U, PP2U, and PP3U fix the board body 21 to the bus bar module BBM.

As illustrated in FIG. 19, a sensor chip of the rotation angle sensor 23a includes a first sensor 116 and a second sensor 124. The rotation angle sensor 23a is a magnetic sensor obtained by integrating the first sensor 116 with the second sensor 124. As illustrated in FIG. 20, the first sensor 116 is provided with a first direction detection circuit 118 and a second direction detection circuit 122. The first sensor 116 outputs detected voltages detected by the first direction detection circuit 118 and the second direction detection circuit 122 to the ECU 10.

The first direction detection circuit 118 is provided with magentoresistive (MR) elements $R_{x1}$, $R_{x2}$, $R_{x3}$, and $R_{x4}$, connection terminals $T_{12}$, $T_{23}$, $T_{34}$, and $T_{41}$, and an amplifier 120. The MR elements $R_{x1}$, $R_{x2}$, $R_{x3}$, and $R_{x4}$ are tunnel magnetoresistance (TMR) elements. The MR elements $R_{x2}$, $R_{x3}$, and $R_{x4}$ may be any of giant magnetoresistance (GMR) elements, anisotropic magnetoresistance (AMR) elements, and Hall elements.

Each of the TMR elements includes a magnetization fixed layer with a fixed magnetization direction, a free layer with the direction of magnetization changing with an external magnetic field, and a nonmagnetic layer disposed between the magnetization fixed layer and the free layer. The resistance value of the TMR element changes with an angle formed by the direction of magnetization of the free layer relative to the direction of magnetization of the magnetization fixed layer. For example, the resistance value is minimum when the angle is 0 degrees, and is maximum when the angle is 180 degrees. Arrows depicted in the MR elements $R_{x1}$, $R_{x2}$, $R_{x3}$, and $R_{x4}$ illustrated in FIG. 20 indicate the magnetization directions of the respective elements in the magnetization fixed layer. As illustrated in FIG. 20, the MR elements $R_{x1}$, $R_{x2}$, $R_{x3}$, and $R_{x4}$ form a bridge circuit.

The connection terminals $T_{12}$ and $T_{34}$ are connected to the amplifier 120. The connection terminal $T_{41}$ is connected to a drive voltage Vcc. Although illustrated as independent from the ECU 10 for the sake of convenience in FIG. 20, the drive voltage Vcc is a voltage supplied from the ECU 10. As illustrated in FIG. 20, the connection terminal $T_{23}$ is connected to a ground GND. The ECU 10 applies the voltage between the connection terminals $T_{41}$ and $T_{23}$ through the harness.

The amplifier 120 is an amplifying circuit that amplifies a received electrical signal. The amplifier 120 is connected, on an input side thereof, to the connection terminals $T_{12}$ and $T_{34}$. The amplifier 120 is connected, on an output side thereof, to the ECU 10. The amplifier 120 amplifies a detection signal received from the connection terminals $T_{12}$ and $T_{34}$, and outputs the result to the ECU 10.

The second direction detection circuit 122 is provided with MR elements $R_{y1}$, $R_{y2}$, $R_{y3}$, and $R_{y4}$, the connection terminals $T_{12}$, $T_{23}$, $T_{34}$, and $T_{41}$, and the amplifier 120. The second direction detection circuit 122 is provided with the MR elements $R_{y1}$, $Ry_2$, $R_{y3}$, and $R_{y4}$ instead of the MR elements $R_{x1}$, $R_{x2}$, $R_{x3}$, and $R_{x4}$. The same components of the second direction detection circuit 122 as those of the first direction detection circuit 118 are denoted by the same reference numerals, and the description thereof will not be repeated.

The MR elements $R_{y1}$, $Ry_2$, $R_{y3}$, and $R_{y4}$ have the same configuration as that of the MR elements $R_{x1}$, $R_{x2}$, $R_{x3}$, and $R_{x4}$ except in the magnetization directions in the magnetization fixed layer. Arrows depicted in the MR elements $R_{y1}$, $R_{y2}$, $R_{y3}$, and $R_{y4}$ indicate the magnetization directions of the respective elements in the magnetization fixed layer.

Since the second sensor 124 has the same components as those of the first sensor 116, the same components are denoted by the same reference numerals, and the description thereof will not be repeated.

The first direction detection circuit 118 and the second direction detection circuit 122 can output the accurate detection signals when being disposed at a predetermined distance with respect to the axial direction Ax of the shaft 31 illustrated in FIG. 19. The first sensor 116 can output predetermined detection signals when having a predetermined relation with the magnet 32. In this way, the first sensor 116 needs to be in a predetermined position with respect to the axial direction Ax of the shaft 31 and the magnet 32. In the same way, the second sensor 124 also needs to be in a predetermined position with respect to the axial direction Ax of the shaft 31 and the magnet 32.

As described above, the fixation positioning pins PP1D, PP2D, and PP3D fix the bus bar module BBM to the heat sink 40, and the board positioning pins PP1U, PP2U, and PP3U fix the board body 21 to the bus bar module BBM. The board positioning pins PP1U, PP2U, and PP3U are present at three or more places, and are not arranged in a straight line. For example, a virtual line connecting the board positioning pin PP1U to the board positioning pin PP2U orthogonally intersects a virtual line connecting the board positioning pin PP1U to the board positioning pin PP3U. This configuration makes the circuit board 20 difficult to rotate relative to the bus bar module BBM. Thus, the first sensor 116 is located in the predetermined position with respect to the axial direction Ax of the shaft 31 and the magnet 32. In the same way, the second sensor 124 is also located in the predetermined position with respect to the axial direction Ax of the shaft 31 and the magnet 32. As a result, the accuracy of the output of the rotation angle sensor 23a increases.

The board positioning pins PP1U, PP2U, and PP3U are press-fitted into the positioning holes BH1, BH2, and BH3, respectively, to place the board body 21 in the state of being fixed to the bus bar module BBM in advance. Then, as illustrated in FIGS. 18A and 18B, the fixation positioning pins PP1D, PP2D, and PP3D are inserted in the positioning holes HH1, HH2, and HH3, respectively, and as a result, the first coil wiring 321 illustrated in FIG. 13 is guided to the through-holes 2321, and the second coil wiring 322 is guided to the through-holes 2322. As a result, the first coil wiring 321 is inserted in the through-holes 2321; the second coil wiring 322 is inserted in the through-holes 2322; and the first coil wiring 321 and the second coil wiring 322 are electrically connected to the internal circuitry of the board body 21 in a reliable manner.

As viewed in the axial direction Ax of the shaft 31, the board positioning pins PP1U, PP2U, and PP3U are located in the same positions as those of the fixation positioning pins PP1D, PP2D, and PP3D, respectively. This configuration allows the positions of the fixation positioning pins PP1D, PP2D, and PP3D to be recognized via the board positioning pins PP1U, PP2U, and PP3U, so that the heat sink 40 can easily be assembled with the bus bar module BBM.

In the bus bar module BBM, the positive electrode bus bar wiring 65 and the positive electrode bus bar wiring 66 for electrically connecting the connector CNT to the first power supply terminal Tdc, the negative electrode bus bar wiring 67 for electrically connecting the connector CNT to the second power supply terminal Tgnd, the fixation positioning pins PP1D, PP2D, and PP3D, and the board positioning pins PP1U, PP2U, and PP3U are integrally formed with the connector CNT by the resin molding.

If the groove 43a formed by the level difference between the first surface 41 and the second surface 42 comes in contact with the outer circumference of the ring-shaped portion 63 of the bus bar module BBM to determine the mounting position of the bus bar module BBM relative to the heat sink 40, the position of the bus bar module BBM with respect to the heat sink 40 is likely to be inaccurate because the dimensional variation of the bus bar module BBM differs from the dimensional variation of heat sink 40. In the third embodiment, a gap is present between the groove 43a and the outer circumference of the ring-shaped portion 63 of the bus bar module BBM illustrated in FIG. 13. This configuration reduces the influence of the dimensional variations of the bus bar module BBM and the heat sink 40. In that case, the bus bar module BBM needs to be positioned with respect to the heat sink 40. As described above, the circuit board 20 is fastened to the heat sink 40 using the fasteners BT such as bolts. If the bus bar module BBM is fixed simply by being sandwiched between the circuit board 20 and the heat sink 40, the position of the bus bar module BBM varies with respect to the heat sink 40. Therefore, in the present embodiment, the fixation positioning pin PP1D, the fixation positioning pin PP2D, and the fixation positioning pin PP3D are inserted in the positioning hole HH1, the positioning hole HH2, and the positioning hole HH3, respectively. Since the fixation positioning pin PP1D, the fixation positioning pin PP2D, and the fixation positioning pin PP3D are not arranged in a straight line, the positional accuracy of the bus bar module BBM increases with respect to the heat sink 40.

REFERENCE SIGNS LIST

1 Electric drive device
10 ECU
18 Harness
20 Circuit board
21 Board body
21a Second surface
21b First surface
23 Detection circuit
23a Rotation angle sensor
23b Motor rotation speed calculation unit
24 Control circuit
25A First power circuit
25B Second power circuit
30 Motor
31 Shaft
32 Magnet
37 First coil
38 Second coil
40 Heat sink
41 First surface
42 Second surface
43H Through-hole
43, 43a, 43b, 43c Groove
43d Rim portion 44 Heat sink body
44P Projecting portion
45 Through-hole
46 Through-hole
50 Lid
60 Adapter
63 Ring-shaped portion
64 Bridge portion
64A First bridge portion
64B Second bridge portion
64C Frame portion
64D Jaw portion
64E Guide portion
64W Jutting portion
65 Positive electrode bus bar wiring
66 Positive electrode bus bar wiring
67 Negative electrode bus bar wiring
68 Capacitor terminal plate
69 Through-hole
321 First coil wiring
322 Second coil wiring
930 Housing
931 Stator core
932 Motor rotor
Ax Axial direction
BBM Bus bar module
BH1, BH2, BH3 Positioning hole
BT Fastener
BTH Through-hole
CNT Connector
CNTH, CNTH1, CNTH2, CNTH3 Insert hole
CNTP Positioning pin
Gr1 First coil group
Gr2 Second coil group
HB Through-hole
HBT Inner wall
HH1, HH2, HH3 Positioning hole
Hcan Through-hole
Hdc Through-hole
Hgnd Through-hole
Hio Through-hole
PP1 First positioning portion
PP1D Fixation positioning pin
PP1U Board positioning pin
PP2 Second positioning portion
PP2D Fixation positioning pin
PP2U Board positioning pin
PP3 Third positioning portion
PP3D Fixation positioning pin
PP3U Board positioning pin
SH Internal threaded hole

The invention claimed is:

1. An electric drive device comprising:
   a motor that includes
      a shaft,
      a motor rotor interlocked with the shaft,
      a motor stator including a stator core configured to rotate the motor rotor and a plurality of coil groups that are divided into at least two systems of first coil groups and second coil groups for each of three phases, and are configured to excite the stator core with three-phase alternating currents, and
      a tubular housing that accommodates therein the motor rotor, the motor stator, and the coil groups;
   an electronic control device that includes
      a magnet provided at an anti-load side end of the shaft in order to control drive of the motor, and
      a circuit board disposed on the anti-load side of the shaft on an extended line thereof extending in an axial direction of the shaft;
   first coil wiring that connects the first coil groups to the circuit board;
   second coil wiring that connects the second coil groups to the circuit board;
   a bus bar module in which a connector, a first power supply terminal, a second power supply terminal, positive electrode bus bar wiring that electrically connects the connector to the first power supply terminal, and negative electrode bus bar wiring that electrically connects the connector to the second power supply terminal are integrally formed with the connector; and
   a heat sink that has a groove on the anti-load side, has the bus bar module inserted in the groove, and supports the circuit board disposed on the anti-load side of the bus bar module, wherein
   the circuit board includes:
      a board body;
      a rotation angle sensor configured to detect rotation of the magnet;
      a first power circuit including a plurality of electronic components configured to supply currents to the first coil groups;
      a second power circuit including a plurality of electronic components configured to supply currents to the second coil groups; and
      a control circuit including an electronic component configured to control the currents supplied by at least one of the first power circuit and the second power circuit,
   the rotation angle sensor is mounted on a first surface of the board body and is opposed to the magnet, and
   the positive electrode bus bar wiring and the negative electrode bus bar wiring extend from the connector, bypass an extended line of the shaft, and are electrically connected to the circuit board in positions at distances from the connector larger than a distance from the connector to the extended line of the shaft.

2. The electric drive device according to claim 1, wherein the bus bar module comprises a communication terminal, and
   the communication terminal is electrically connected to the board body in a position at a distance from the connector smaller than the distance from the connector to the extended line of the shaft.

3. The electric drive device according to claim 1, wherein at least one or some of the electronic components included in the first power circuit and at least one or some of the electronic components included in the second power circuit are mounted on the first surface of the board body, and are opposed to the heat sink with a heat dissipation material interposed therebetween.

4. The electric drive device according to claim 1, wherein the bus bar module has a through-hole, and the rotation angle sensor and the magnet are disposed in the through-hole as viewed from the axial direction.

5. The electric drive device according to claim 4, wherein a thickness in the axial direction of each of the positive electrode bus bar wiring and the negative electrode bus bar wiring around the through-hole is larger than a width of each of the positive electrode bus bar wiring and the negative electrode bus bar wiring in a direction orthogonal to the axial direction.

6. The electric drive device according to claim 1, wherein the first coil wiring or the second coil wiring passes through the heat sink with a resin of the bus bar module interposed between wires thereof, and is electrically connected to the board body.

7. The electric drive device according to claim 6, wherein
the bus bar module comprises a guide portion accommodated in a through-hole of the heat sink, and
the through-hole of the guide portion has a tapered inner wall having a diameter gradually decreasing as a depth increases from a load side toward the anti-load side.

8. The electric drive device according to claim 7, wherein
the bus bar module comprises a first bridge portion, a second bridge portion, a ring-shaped portion, and a frame portion,
the ring-shaped portion is disposed between the first bridge portion and the second bridge portion,
the second bridge portion, the ring-shaped portion, and the frame portion surround a raised portion having a second surface raised from a first surface at a bottom of the groove, and
the through-hole of the heat sink is located between a rim portion on an outer circumference of the heat sink and the raised portion.

9. The electric drive device according to claim 8, wherein the rotation angle sensor and the magnet are disposed in the ring-shaped portion.

10. The electric drive device according to claim 1, wherein
the bus bar module comprises a plurality of fixation positioning pins and a ring-shaped portion having a though-hole in which the magnet is inserted, and
the heat sink has a plurality of positioning holes on the anti-load side thereof, and the fixation positioning pins are inserted in the positioning holes.

11. The electric drive device according to claim 10, wherein
the bus bar module is accommodated within a level difference provided on the anti-load side of the heat sink,
a gap is present between an outer circumference of the ring-shaped portion and a wall surface of a groove generated by the level difference of the heat sink,
the fixation positioning pins are present at three or more places, and
the fixation positioning pins are not arranged in a straight line.

12. The electric drive device according to claim 10, wherein
the bus bar module comprises board positioning pins that project in a direction opposite to that of the fixation positioning pins, and
the board positioning pins penetrate the circuit board from the bus bar module.

13. The electric drive device according to claim 12, wherein
the board positioning pins are present at three or more places, and
the board positioning pins are not arranged in a straight line.

14. The electric drive device according to claim 12, wherein the board positioning pins are located in the same positions as those of the fixation positioning pins as viewed in the axial direction of the shaft.

15. An electric power steering device comprising the electric drive device according to claim 1, wherein the electric drive device is configured to generate steering assist torque.

* * * * *